(12) United States Patent
Taya

(10) Patent No.: US 10,699,441 B2
(45) Date of Patent: Jun. 30, 2020

(54) CALIBRATION APPARATUS, CALIBRATION METHOD AND STORAGE MEDIUM

(71) Applicant: CANON KABUSHIKI KAISHA, Tokyo (JP)

(72) Inventor: Kaori Taya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/381,139

(22) Filed: Apr. 11, 2019

(65) Prior Publication Data

US 2019/0325608 A1    Oct. 24, 2019

(30) Foreign Application Priority Data

Apr. 24, 2018   (JP) .................................. 2018-083457

(51) Int. Cl.
  *G06T 7/80* (2017.01)
  *H04N 17/00* (2006.01)
  *G06T 7/246* (2017.01)
(52) U.S. Cl.
  CPC ................ *G06T 7/80* (2017.01); *G06T 7/248* (2017.01); *H04N 17/002* (2013.01); *G06T 2207/30204* (2013.01)
(58) Field of Classification Search
  None
  See application file for complete search history.

(56) References Cited

U.S. PATENT DOCUMENTS

| 2009/0096879 | A1* | 4/2009 | Motomura | ............... G03B 5/00 |
| | | | | 348/208.6 |
| 2017/0355078 | A1* | 12/2017 | Ur | ......................... B25J 9/1612 |

FOREIGN PATENT DOCUMENTS

JP        2014089168 A      5/2014

OTHER PUBLICATIONS

Armangue et al. "Overall view regarding fundamental matrix estimation." Image and Vision Computing. vol. 21. 2003: 205-220. Cited in the Specification.

* cited by examiner

*Primary Examiner* — Samira Monshi
(74) *Attorney, Agent, or Firm* — Rossi, Kimms & McDowell LLP

(57) ABSTRACT

The calibration apparatus includes: an image acquisition unit configured to acquire images captured by a plurality of cameras; a vibration detection unit configured to detect vibration of the camera from the images for each of the cameras; an extraction unit configured to extract images captured by the camera whose vibration is within an allowable value and whose position and orientation are regarded as being the same as an image group for each of the cameras; a selection unit configured to select the image groups whose number is larger than or equal to a predetermined number of cameras as a combination; and an estimation unit configured to estimate a position and orientation parameter for each of the cameras by using the selected combination of the image groups.

10 Claims, 16 Drawing Sheets

CALIBRATION APPARATUS, CALIBRATION METHOD AND STORAGE MEDIUM

BACKGROUND OF THE INVENTION

Field of the Invention

The present invention relates to a calibration technique of a camera, and in more detail, relates to a technique to estimate the position and orientation of a camera as a parameter from an image.

Description of the Related Art

In recent years, a virtual viewpoint image generation technique to generate an image from a virtual viewpoint different from an image capturing viewpoint from a group of images obtained by capturing an object from a plurality of viewpoints and a shape acquisition technique to obtain a three-dimensional shape of an object are known. Then, these techniques premise that the position and orientation parameter of cameras arranged at a plurality of viewpoints is found correctly, and therefore, it is common to perform calibration at the time of installation of cameras to find the position and orientation parameter of the cameras.

Japanese Patent Laid-Open No. 2014-89168 has disclosed a technique to perform calibration by moving a sphere having a known diameter and capturing the sphere by a plurality of cameras, and further, by recognizing positions within an image, which correspond to the same position on a space, in cameras in opposition to each other. By using the technique of Japanese Patent Laid-Open No. 2014-89168, it is possible to perform calibration with a high accuracy by moving a marker in an area in which the object is viewed as one whose size is approximately the same from the cameras in opposition to each other.

Incidentally, in an image capturing environment in which the distance between a gaze point and a camera is long, for example, in an image capturing environment, such as an athletic stadium, generally, a photo lens whose focal length is long is used. However, in image capturing using the photo lens such as this, the photo lens is heavier than a normal lens, and therefore, unstable physical vibration is likely to occur, and therefore, there is a case where the position and orientation of the camera gradually change during calibration.

Then, in a case where the position and orientation of the camera gradually change during calibration due to vibration, with the technique of Japanese Patent Laid-Open No. 2014-89168, the processing is performed by supposing that the position and orientation are the same during calibration, and therefore, an error occurs in estimation results of the position and orientation parameter. That is, with the technique of Japanese Patent Laid-Open No. 2014-89168, in a case where the position and orientation of the camera gradually change during calibration due to vibration, it is not possible to estimate the position and orientation parameter of a multiple viewpoint camera.

Consequently, an object of the present invention is to estimate the position and orientation parameter of a multiple viewpoint camera with a high accuracy even in a case where the position and the orientation of the camera vary during camera calibration.

SUMMARY OF THE INVENTION

In order to attain the above-described object, the calibration apparatus of the present disclosure includes: an image acquisition unit configured to acquire images captured by a plurality of image capturing apparatuses; a vibration detection unit configured to detect vibration of the image capturing apparatus from the images for each of the image capturing apparatus; an extraction unit configured to extract images captured by the image capturing apparatus whose vibration is within an allowable value and whose position and orientation are regarded as being the same as an image group for each of the image capturing apparatuses; a selection unit configured to select the image groups whose number is larger than or equal to a predetermined number of image capturing apparatuses as a combination; and an estimation unit configured to estimate a position and orientation parameter for each of the image capturing apparatuses by using the selected combination of the image groups.

Further features of the present disclosure will become apparent from the following description of exemplary embodiments with reference to the attached drawings.

DESCRIPTION OF THE EMBODIMENTS

First Embodiment

In the following, with reference to the drawings, the calibration apparatus according to the embodiments of the present disclosure is explained. The following embodiments are not intended to limit the present disclosure and all combinations of features explained in the present embodiments are not necessarily indispensable to the solution of the present disclosure.

In the present embodiment, in a case where the position and orientation of a camera vary during calibration, by detecting the variation of the camera in a plurality of cameras and by using an image group whose position and orientation are regarded as being the same in each camera, the position and orientation parameter of the camera is estimated with a high accuracy.

Figure 1:
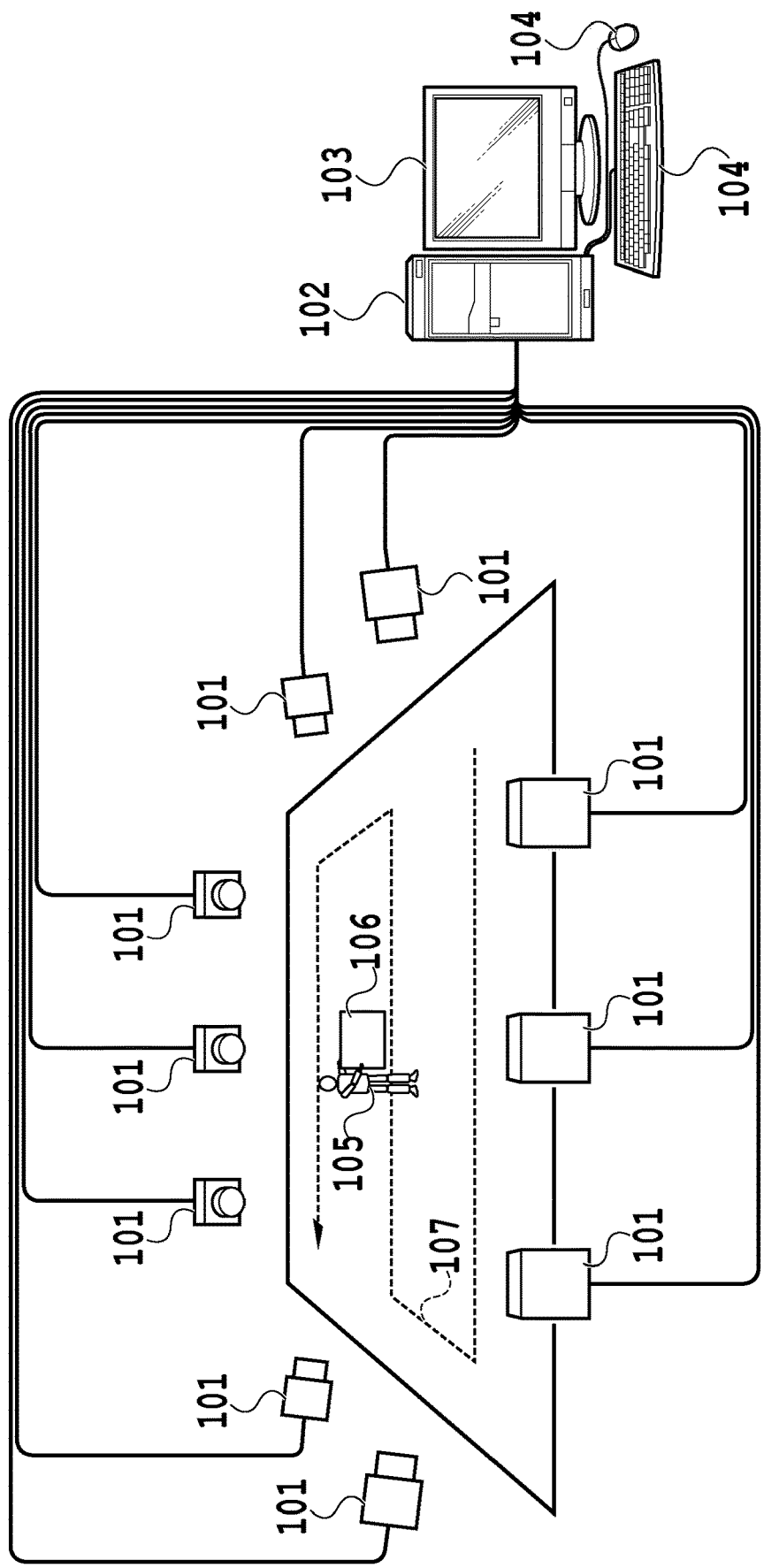
FIG. 1 is a schematic diagram of an image processing system.

In the following, by using FIG. 1, a configuration of the present embodiment is explained. FIG. 1 is a schematic diagram of an image processing system according to the present embodiment. An image processing system 1 includes a plurality of cameras 101, an image processing apparatus 102, a display device 103, and an input device 104.

The cameras 101 are arranged in an area on an approximate plane and capture an object 105 from a plurality of viewpoints so as to surround the object 105. The image processing apparatus 102 generates, for example, a virtual viewpoint image and the like from images captured by the cameras 101. Further, a user checks settings of image capturing conditions and various kinds of image data (for example, results of performing image processing for image data acquired by image capturing, and the like) by using the display device 103 and the input device 104. At the time of execution of calibration, calibration is performed by capturing a marker 106 by the cameras 101 and further, by recognizing the captured marker 106 in the image processing apparatus 102. That is, in this case, the image processing apparatus 102 functions as a calibration apparatus.

Figure 2:
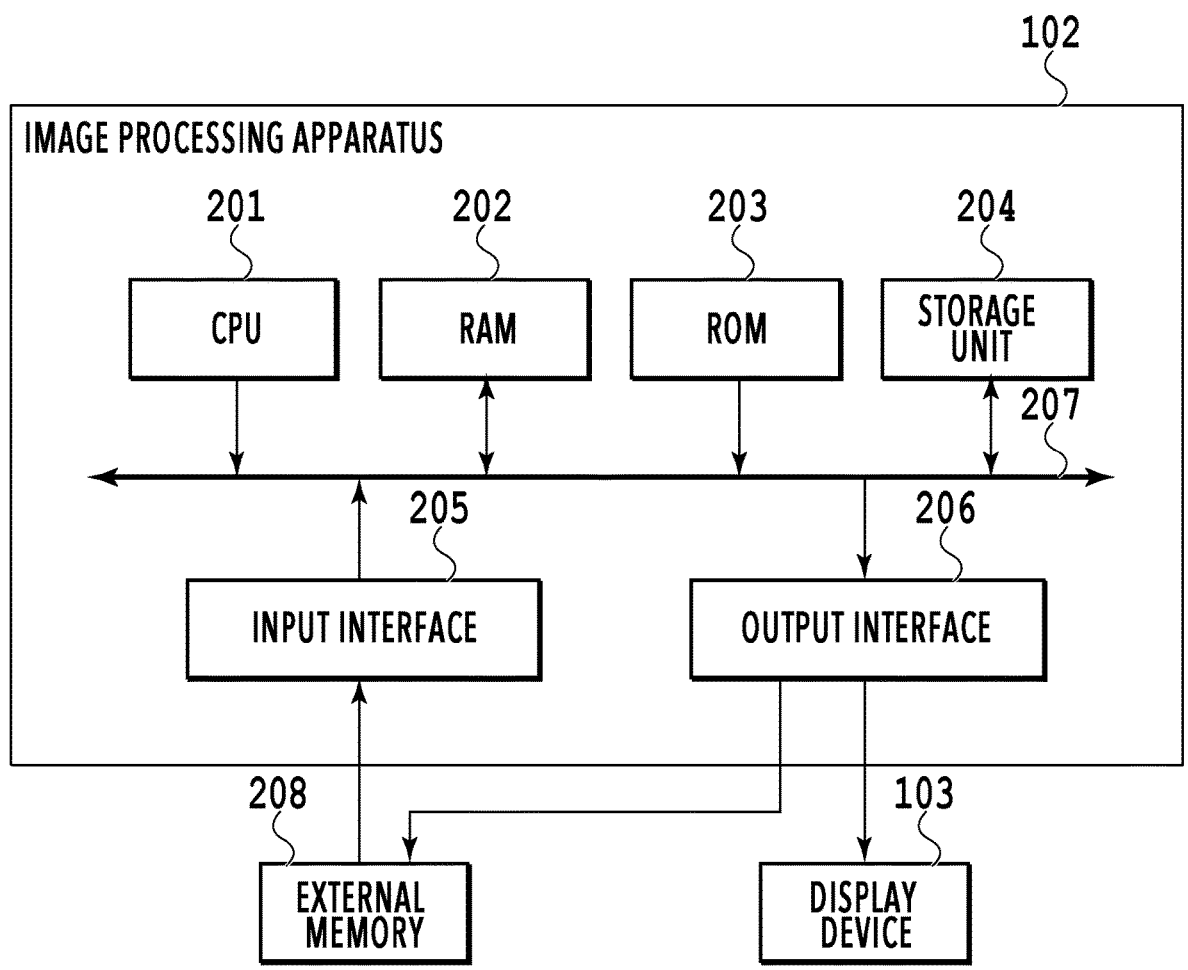
FIG. 2 is a block diagram showing a hardware configuration of an image processing apparatus.

FIG. 2 is a block diagram showing a hardware configuration of the image processing apparatus 102. The image processing apparatus 102 includes a CPU 201, a RAM 202, a ROM 203, a storage unit 204, an input interface 205, an output interface 206, and a system bus 207. Further, to the image processing apparatus 102, an external memory 208 and the display device 103 are connected. In detail, the external memory 208 is connected to the input interface 205 and the output interface 206 of the image processing apparatus 102 and the display device 103 is connected to the output interface 206 of the image processing apparatus 102.

The CPU (Central Processing Unit) 201 is a processor that centralizedly controls each configuration of the image processing apparatus 102. The RAM (Random Access Memory) 202 is a memory that functions as a main memory and a work area of the CPU 201. The ROM (Read Only Memory) 203 is a memory that stores programs and the like used for the processing within the image processing apparatus 102. The CPU 201 performs a variety of kinds of processing, to be described later, by executing programs stored in the ROM 203.

The storage unit 204 is a storage device that stores image data used for the processing in the image processing apparatus 102, parameters used at the time of execution of the processing, and so on, and for example, an HDD (Hard Disk Drive), an optical disc drive, a flash memory, and so on.

The input interface 205 is a serial bus interface, for example, such as USB (Universal Serial Bus) and IEEE 1394. It is possible for the image processing apparatus 102 to acquire processing-target image data and the like from the external memory 208 (for example, HDD, memory card, CF card, SD card, USB memory) via the input interface 205.

The output interface 206 is a video image output terminal, for example, such as DVI (Digital Visual Interface) and HDMI (High-Definition Multimedia Interface) (registered trademark). It is possible for the image processing apparatus 102 to output image data for which image processing has been performed in the image processing apparatus 102 to the display device 103 (image display device, such as a liquid crystal display) via the output interface 106. As the components of the image processing apparatus 102, blocks other than those blocks described above exist, but they are not the main purpose of the present disclosure, and therefore, explanation thereof is omitted here.

Figure 3:
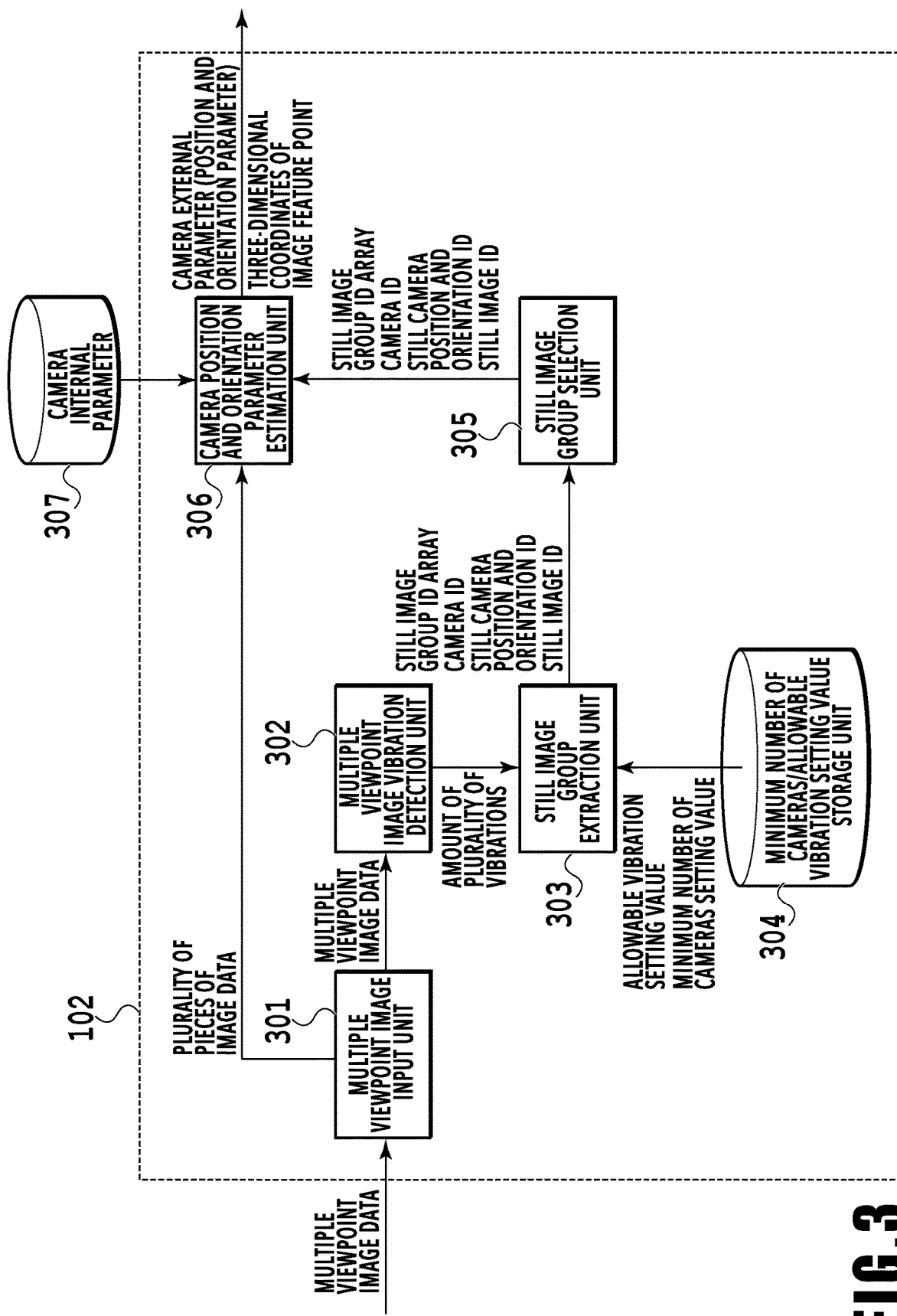
FIG. 3 is a function block diagram of the image processing apparatus.

In the following, the processing and the procedure of the processing in the image processing apparatus 102 are explained by using the function block diagram shown in FIG. 3 and the flowchart shown in FIG. 4. FIG. 3 is the function block diagram of the image processing apparatus 102. In the present embodiment, the CPU 201 executes a program represented by the flowchart in FIG. 4, which is stored in the ROM 203, to thereby function as each block described in FIG. 3. As a matter of course, it is not necessary for the CPU 201 to have the functions of all the processing blocks and it may also be possible to provide anew a processing circuit corresponding to each processing block within the image processing apparatus 102. In the following, symbol "S" in the explanation of the flowchart represents a step.

At S401, a multiple viewpoint image input unit 301, which is an example of an image acquisition unit, acquires multiple viewpoint image data from the external memory 208 via the input interface 205 and stores the multiple viewpoint image data in the RAM 202. Here, the multiple viewpoint image data is data relating to a plurality of images obtained by capturing the same object from viewpoints different from one another.

It is premised that the number of viewpoints is two or more, and therefore, it is assumed that the number of viewpoints is at least two and the number of images in one camera is two or more (two or more points in time). Further, the image data may be a moving image, images captured successively as still image, or images obtained by time-lapse image capturing. Furthermore, it is assumed that images indicating the same point in time in a multiple viewpoint camera are synchronized with a high accuracy. In a case where images are not synchronized with a high accuracy, it may also be possible to fix images at the same point in time with a high accuracy so that the image feature and the marker do not move.

At S402, a multiple viewpoint image vibration detection unit 302 detects the amount of vibration for each of multiple viewpoint images. Specifically, the vibration of the camera 101 is detected by detecting an image feature of an object at rest or a marker at rest as a feature point in images at a plurality of points in time of the same viewpoint and further tracking the feature point. In addition, it may also be possible to mount an angle sensor or an acceleration sensor on each camera and to detect vibration from the value measured by the sensor.

At S403, a still image group extraction unit 303 reads an allowable vibration setting value from a minimum number of cameras/allowable vibration setting value storage unit 304 and extracts an image ID at the point in time at which the vibration of the camera 101 is smaller than or equal to the allowable vibration setting value (hereinafter, this ID is referred to as still image ID) for each camera. Further, the still image group extraction unit 303 divides the images acquired at S401 into groups of images whose position and orientation can be regarded as being the same for each camera and sets an ID (hereinafter, this ID is referred to as still camera position and orientation ID). The still image group extraction unit 303 stores the still camera position and orientation ID and the still image ID acquired as the results of performing the processing at S403 in association with the camera ID of each camera 101.

Figure 6A:
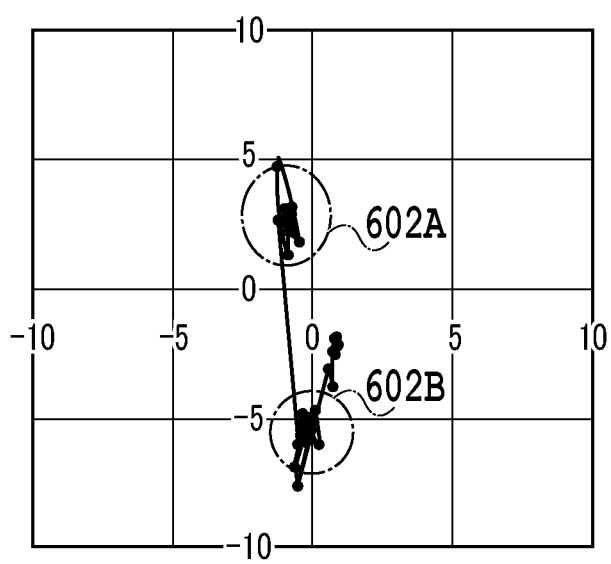
FIG. 6A is a diagram showing a relationship between vibration of a camera and the position and orientation of a still camera.
Figure 6B:
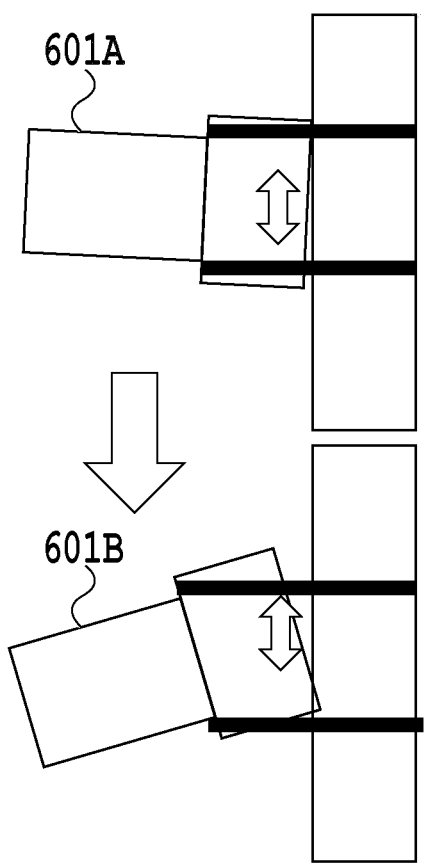
FIG. 6B is a diagram showing a relationship between vibration of a camera and the position and orientation of a still camera.

As a supplement, by using FIG. 6A and FIG. 6B, the processing at S403 is explained. FIG. 6A and FIG. 6B are each a diagram showing a relationship between vibration of a camera and the position and orientation of a still camera. In a graph in FIG. 6A, a detected feature point is indicated as two-dimensional movement on the image of a marker. Further, in a transition diagram of the state of the camera 101 in FIG. 6B, a change in the position and orientation of the camera due to vibration is shown and specifically, the state is shown where the camera 101 makes a transition (changes) into 601B from 601A.

By clustering points in time at which vibration is within an allowable value from the transition diagram in FIG. 6B, it is possible to find the still camera position and orientation ID 602A and the still image ID corresponding to the state 601A and the still camera position and orientation ID 602B and the still image ID corresponding to the state 601B.

Returning to FIG. 4, at S404, the still image group extraction unit 303 refers to the results at the previous step S403 and determines whether or not an image captured by the camera whose vibration is not smaller than or equal to the allowable vibration setting value exists. Then, in a case where it is determined that an image captured by the camera whose vibration is not smaller than or equal to the allowable vibration setting value exists by the still image group extraction unit 303 (Yes at S404), the image processing apparatus 102 advances the processing to S405. Further, in a case where it is determined that all the images are images captured by the camera whose vibration is smaller than or equal to the allowable vibration setting value (No at S404) by the still image group extraction unit 303, the image processing apparatus 102 advances the processing to S408. In a case of No at S404, the processing is the same as the normal position and orientation parameter estimation processing using all the images.

At S405, the still image group extraction unit 303 reads the minimum number of cameras setting value from the minimum number of cameras/allowable vibration setting value storage unit 304 and stores the minimum number of cameras setting value in the RAM 202.

At S406, the still image group extraction unit 303 extracts the still image IDs that exist and whose number is larger than or equal to the minimum number of cameras setting value of the still image IDs stored in the RAM 202, and the still camera position and orientation IDs corresponding thereto. Further, the still image group extraction unit 303 classifies the still image IDs into image groups (hereinafter, referred to as still image groups) for each still same camera position and orientation ID and sets an ID for each classified image group (hereinafter, referred to as still image group ID). Then, the camera ID, the still camera position and orientation ID, the still image ID, and the still image group ID, which are acquired by performing S406, are stored in the RAM 202.

Figure 7:
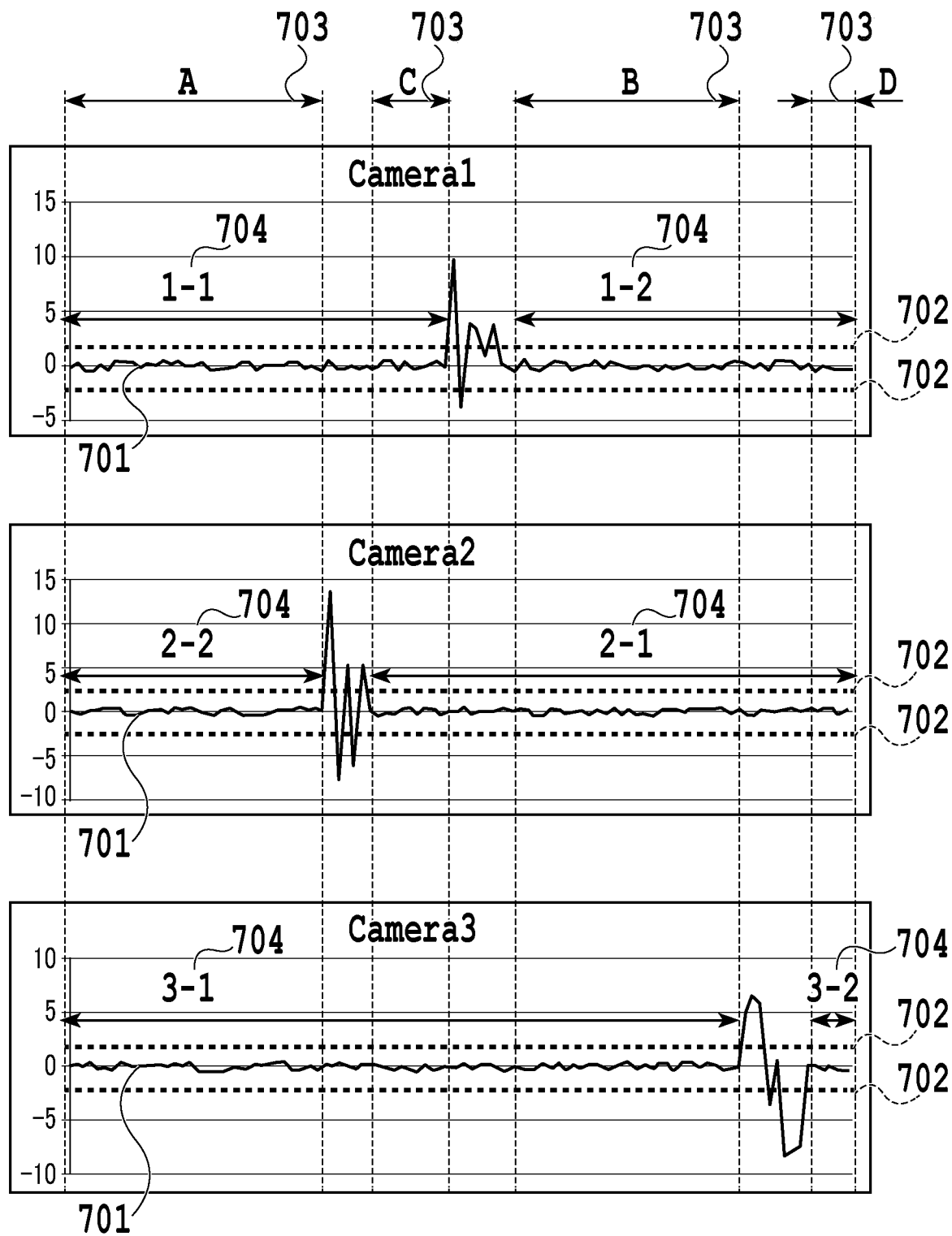
FIG. 7 is a diagram for explaining extraction processing of a still image group.
Figure 8:
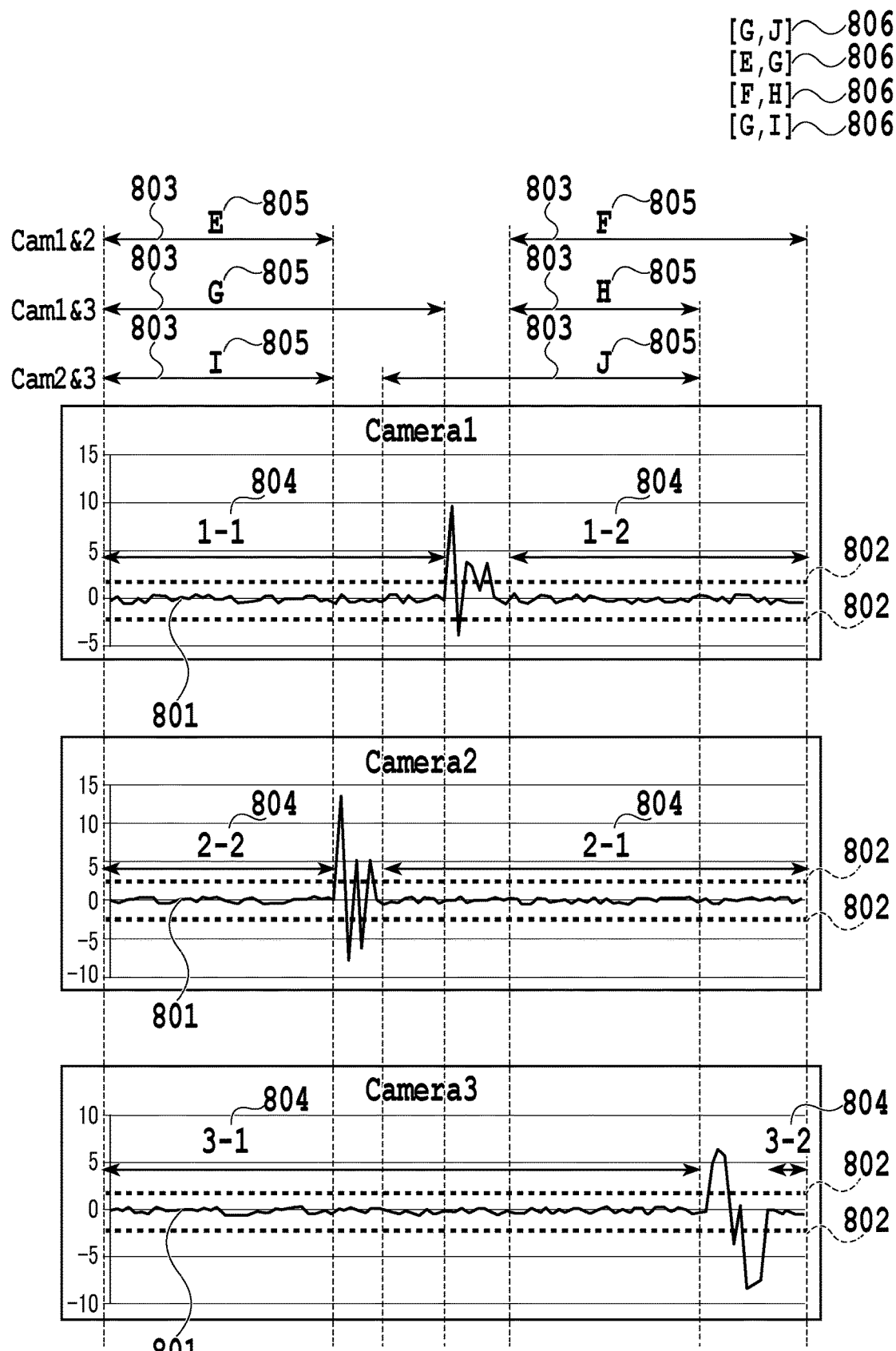
FIG. 8 is a diagram for explaining extraction processing of a still image group.

Next, by using FIG. 7 and FIG. 8, the processing at S406 is supplemented. FIG. 7 and FIG. 8 are diagrams for explaining still image group extraction processing. FIG. 7 is a diagram for explaining the still image group extraction processing in a case where the minimum number of cameras setting value is set to three and the number of cameras is set to three. In FIG. 7, symbol 701 indicates an amount of a plurality of vibrations, symbol 702 indicates an allowable vibration setting value, symbol 703 indicates a still image ID, symbol 704 indicates a still camera position and orientation ID, and symbol 705 indicates a still image group ID.

Further, FIG. 8 is a diagram for explaining the still image group extraction processing in a case where the minimum number of cameras setting value is set to two and the number of cameras is set to three. In FIG. 8, symbol 801 indicates an amount of a plurality of vibrations, symbol 802 indicates an allowable vibration setting value, symbol 803 indicates a still image ID, symbol 804 indicates a still camera position and orientation ID, symbol 805 indicates a still image group ID, and symbol 806 indicates a still image group ID array.

Returning to FIG. 4, at S407, a still image group selection unit 305 selects one combination of still image groups (still image group IDs) from the still image groups stored in the RAM 202 so that the still camera position and orientation ID in the same camera ID is the same.

As a criterion of extracting a still image group ID, for example, it is sufficient to extract a still image group ID (or still image group ID array) so that the number of still images is large. For example, in a case of FIG. 7, regarding the still image group ID, the number of images is larger in order of A, B, C, and D, and therefore, the still image group ID whose number of images is the largest is A. Further, in a case of FIG. 8, regarding the still image group ID array, the number of images is larger in order of [G, J], [E, G], [F, H], and [G, I], and therefore, the still image group ID array whose number of mages is the largest is [G, J]. In addition, it may also be possible to enable a user to select a still image group ID (or still image group ID array) from presented still image group IDs (or still image group ID arrays) by presenting several still image group IDs (or still image group ID arrays) as in FIG. 7 and FIG. 8. As a supplement, in the subsequent description, even in a case where the still image group ID is described, it is assumed that there is a case where the still image group ID array is included.

At S408, a camera position and orientation parameter estimation unit 306 estimates the position and orientation parameter of the camera and the three-dimensional coordinates of the image feature point by using the camera ID and the image feature point of the image corresponding to the image ID stored in the RAM 102 and stores them in the RAM 202.

Figure 4:
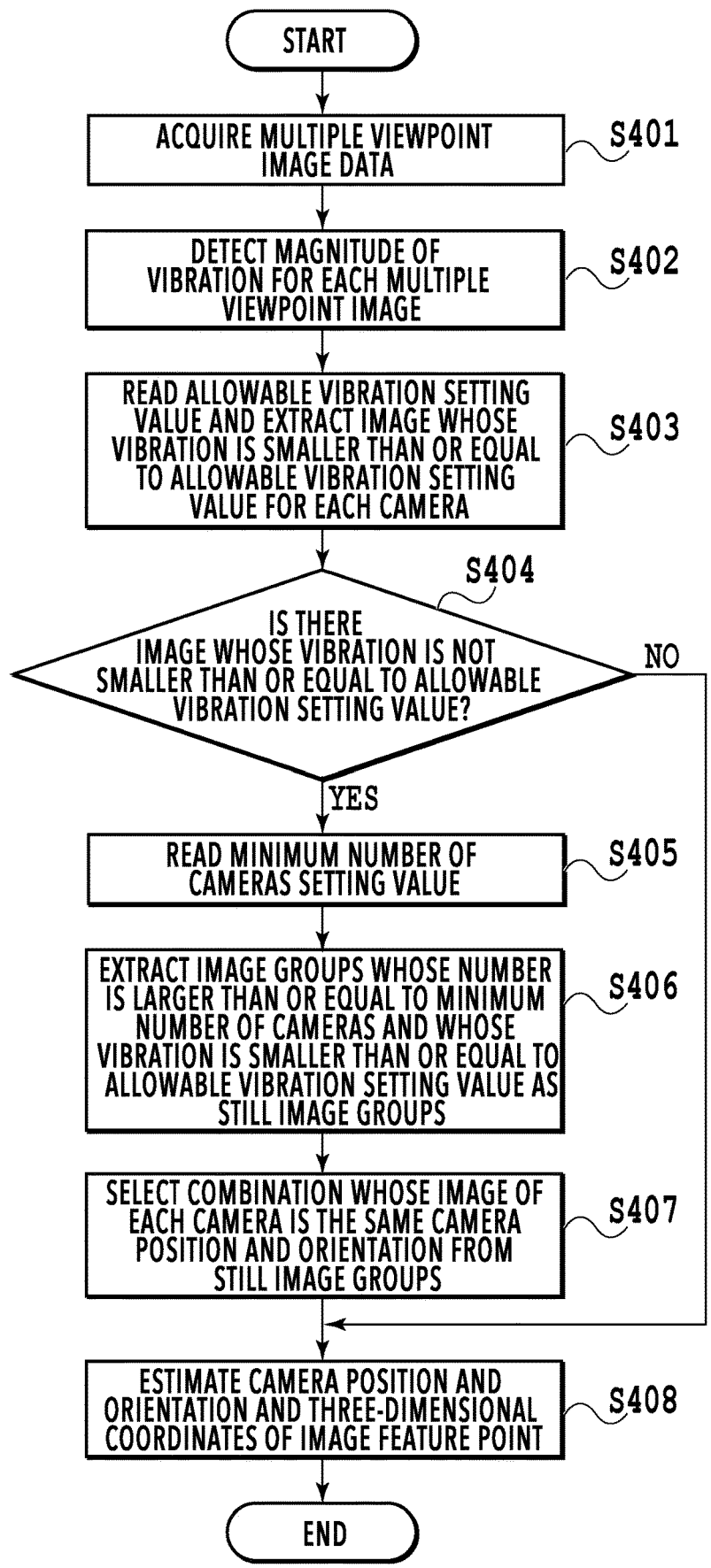
FIG. 4 is a flowchart showing a procedure of processing in the image processing apparatus.
Figure 5:
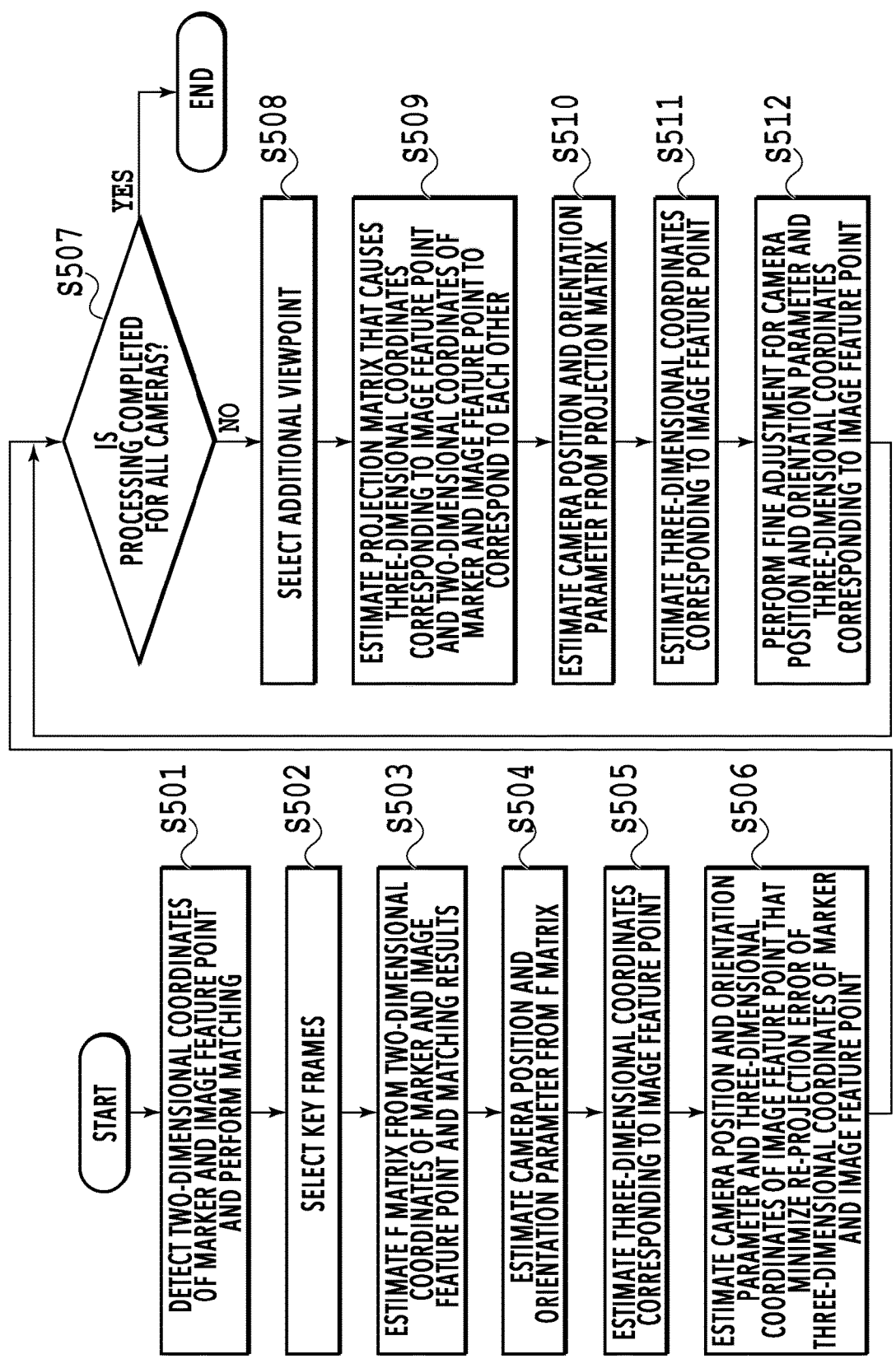
FIG. 5 is a flowchart showing a procedure of estimation processing of a position and orientation parameter of a camera.

Next, by using the flowchart in FIG. 5, the processing at S408 in FIG. 4, that is, the position and orientation parameter estimation processing of the camera in the camera position and orientation parameter estimation unit 306 is explained in detail.

At S501, the camera position and orientation parameter estimation unit 306 detects the two-dimensional coordinates of a marker and an image feature point and performs matching of the image feature point between cameras for a plurality of images of all the cameras.

At S502, the camera position and orientation parameter estimation unit 306 selects two cameras (hereinafter, referred to as key frames) for finding the position and orientation parameter of the camera from all the cameras. The key frame may be set in advance or it may also be possible to select two cameras whose number of matches of the recognized markers and image feature points is the largest as key frames. In addition, in a case where the order and the position relationship of the cameras are roughly set in advance, it may also be possible to select two cameras whose positions are close to each other and whose number of corresponding markers and image feature points is large as key frames by using the information.

At S503, the camera position and orientation parameter estimation unit 306 estimates an F matrix from the two-dimensional coordinates of the markers and image feature points of the selected key frames and the matching results. The F matrix (fundamental matrix) is also referred to as a basic matrix and is a matrix indicating a relative relationship between viewpoints of two cameras. Specifically, in a case where the marker coordinates of camera viewpoints of the two key frames are taken to be $[x_{0i}, y_{0i}]$ and $[x_{1i}, y_{1i}]$ (i=1, ..., N, N is the number of markers), the matrix is indicated as a matrix that satisfies an expression below.

[Mathematical expression 1]

$$x_{0i} = \begin{bmatrix} x_{0i} \\ y_{0i} \\ 1 \end{bmatrix} x_{1i} = \begin{bmatrix} x_{1i} \\ y_{1i} \\ 1 \end{bmatrix} \quad (1)$$

$$x_{1i}^T F x_{0i} = 0$$

In a case where the F matrix is estimated, for example, it is possible to use a solution by DLT (Direct Linear Transformation), and the like. Further, in the matching results of image feature points, an erroneous association is included frequently, and therefore, it is preferable to omit the erroneous association from the calculation by deleting outliers by using the robust estimation method, such as ransac and M estimation. This is described in detail in "Overall view regarding fundamental matrix estimation", X Armangue, J Salvi, Image and vision computing, 2003.

At S503, in a case where the robust estimation method is used, on a condition that the reliability of the marker and that of the image feature point are different, it is better to perform the robust estimation in accordance therewith. Here, in a case where ransac is used at the robust estimation, by causing the marker and the image feature point whose reliability is high to be sampled at a high frequency, it is made easy to delete a marker and an image feature point inconsistent with the marker and the image feature point whose reliability is high.

Further, in a case where the M estimation is used as the robust estimation method, as in an expression below, the marker and the image feature point are multiplied by weight $\alpha_{1i}$ and $\alpha_{2i}$.

[Mathematical expression 2]

$$x_{0i} = \begin{bmatrix} x_{0i} \\ y_{0i} \\ 1 \end{bmatrix} x_{1i} = \begin{bmatrix} x_{1i} \\ y_{1i} \\ 1 \end{bmatrix} \quad (2)$$

$$\alpha_{1i}\alpha_{2i} x_{1i}^T F x_{0i} = 0$$

In the above expression, by performing a calculation by increasing $\alpha_i$ of the marker and the image feature point whose reliability is high and decreasing $\alpha_i$ of the marker and the image feature point whose reliability is low, it is made easier to delete an image feature point inconsistent with the marker and the image feature point whose reliability is high as an outlier.

At S504, the camera position and orientation parameter estimation unit 306 estimates the position and orientation parameter of the camera (that is, position t of the camera and orientation R of the camera) from the F matrix. Specifically, the inverse matrix of an internal parameter matrix $A_1$ of the camera is multiplied to the left of the F matrix and the inverse matrix of an internal parameter matrix $A_0$ of the camera is multiplied to the right of the F matrix, and the product is subjected to singular value decomposition and further, decomposed into orthogonal matrixes U and V and a diagonal matrix $\Sigma$, the position t and the orientation R of the camera may be found.

[Mathematical expression 3]

$$A_1^{-1} F A_0^{-1} = U \Sigma V^T \quad (3)$$

$$R_2 = U R_Z^T V^T$$

$$t_2 = U R_Z \Sigma U^T$$

$$R_Z = \begin{bmatrix} 0 & 1 & 0 \\ -1 & 0 & 0 \\ 0 & 0 & 1 \end{bmatrix} \text{ or}$$

$$\begin{bmatrix} 0 & -1 & 0 \\ 1 & 0 & 0 \\ 0 & 0 & 1 \end{bmatrix}$$

$R_z$ is one of the two patterns and it is sufficient to perform setting so that the three-dimensional point of the corresponding point is not arranged behind the camera. R and t calculated here are a position $t_2$ and an orientation $R_2$ of the second camera (hereinafter, referred to as camera 1) in a case where a position $t_1$ of the first camera (hereinafter, referred to as camera 0) is taken to be the origin and an orientation $R_1$ is taken to be a unit matrix.

At S505, the camera position and orientation parameter estimation unit 306 estimates three-dimensional coordinates corresponding to the image feature point from the position and orientation parameter estimated at S504 and the matching results of the image feature points of the key frames. Specifically, three-dimensional coordinates XYZ are represented as an expression below for coordinates x and y on the image.

[Mathematical expression 4]

$$\begin{bmatrix} X \\ Y \\ Z \end{bmatrix} = R^{-1} A^{-1} \begin{bmatrix} x \\ y \\ 1 \end{bmatrix} s - R^{-1} t \quad (4)$$

Here, a set $[X_{ki}, Y_{ki}, Z_{ki}]$ of the three-dimensional coordinates corresponding to the i-th (i=1 ... N, N is the number of feature matches) feature point $[x_{ki}, y_{ki}]$ of the camera k (k=0, 1) is represented as an expression below by using an unknown variable $s_{ki}$. The set $[X_{ki}, Y_{ki}, Z_{ki}]$ of the three-dimensional coordinates is referred to as $p_{ki}$ hereinafter.

[Mathematical expression 5]

$$a_{ki} = R_k^{-1} A_k^{-1} \begin{bmatrix} x_{ki} \\ y_{ki} \\ 1 \end{bmatrix} b_{ki} = -R_k^{-1} t_k \quad (5)$$

$$p_{ki} = \begin{bmatrix} X_{ki} \\ Y_{ki} \\ Z_{ki} \end{bmatrix}$$

$$p_{ki} = a_{ki} s_{ki} + b_{ki}$$

In this case, by finding $s_{ki}$ so that the Euclid distance between $p_{ki}$ (k=0, 1) becomes the shortest and calculating an average of $p_{ki}$, it is possible to find a three-dimensional point $[X_i, Y_i, Z_i]$ corresponding to the coordinates $[x_{ki}, y_{ki}]$ (k=1, 0) of the feature point. The three-dimensional point $[X_i, Y_i, Z_i]$ is referred to as $p_i$ hereinafter.

[Mathematical expression 6]

$$p_i = \frac{\sum_{k=1}^{2} p_{ki}}{2} \quad (6)$$

Here, it is possible to find $s_{ki}$ that makes the Euclid distance between $p_{ki}$ (k=0, 1) the shortest by an expression below.

[Mathematical expression 7]

$$\begin{bmatrix} s_{1i} \\ s_{2i} \end{bmatrix} = \begin{bmatrix} \frac{1}{2}a_{1i}^T a_{1i} & -\frac{1}{2}a_{1i}^T a_{2i} \\ -\frac{1}{2}a_{2i}^T a_{1i} & \frac{1}{2}a_{2i}^T a_{2i} \end{bmatrix}^{-1} \begin{bmatrix} -a_{1i}^T b_{1i} + \frac{1}{2}a_{1i}^T \sum_{k=1}^{2} b_{ki} \\ -a_{2i}^T b_{2i} + \frac{1}{2}a_{2i}^T \sum_{k=1}^{2} b_{ki} \end{bmatrix} \quad (7)$$

Then, by substituting $s_{1i}$ and $s_{2i}$ calculated by expression (7) in expression (5), it is possible to find the three-dimensional point $p_i$ from expression (6). In a case where one of $s_{1i}$ and $s_{2i}$ calculated by expression (7) is a negative value, a three-dimensional point is generated on the behind side with respect to the camera (that is, predicted as an erroneous corresponding point), and therefore, in such a case, it is sufficient to delete the negative value as an outlier.

At S506, the camera position and orientation parameter estimation unit 306 performs fine adjustment for the position and orientation parameter and the three-dimensional coordinates corresponding to the image feature point so that the re-projection error between the re-projection of the three-dimensional coordinates of the feature point onto the camera image and the two-dimensional coordinates of the feature point becomes a minimum. The position and orientation parameter is the parameter estimated at S504 and the three-dimensional coordinates corresponding to the image feature point are those estimated at S505. This processing (adjustment) is also referred to as bundle adjustment.

An error $E(R_0, R_1, t_0, t_1, \ldots, p_N)$ between re-projection $[x(R_k, t_k, p_i), y(R_k, t_k, p_i)]$ of the three-dimensional point $p_i$ (i=1, ... N) and the coordinates $[x_{ki}, y_{ki}]$ of the marker or the image feature point is represented by an expression below.

[Mathematical expression 8]

$$E(R_0, R_1, t_0, t_1, p_1, \ldots, p_N) = \quad (8)$$
$$\frac{1}{2} \sum_{i=1}^{N} \sum_{k=1}^{2} \alpha_{ki} \{(x_{ki} - x(R_k, t_k, p_i))^2 + (y_{ki} - y(R_k, t_k, p_i))^2\}$$

$$z_{ki} \begin{bmatrix} x(R_k, t_k, p_i) \\ y(R_k, t_k, p_i) \\ 1 \end{bmatrix} = A_k [R_k \quad t_k] \begin{bmatrix} p_i \\ 1 \end{bmatrix}$$

Here, $\alpha_{ki}$ is the reliability of the coordinates on the image in the camera k of the i-th marker or feature point. Further, by increasing $\alpha_{ki}$ of the marker and the image feature point whose reliability is high, and decreasing $\alpha_{ki}$ of the marker and the image feature point whose reliability is low, it is possible to make the error of the marker whose reliability is high as small as possible.

Then, $R_0, R_1, t_0, t_1, p_1, \ldots p_N$ that minimize the value of the error E are found by using a nonlinear optimization method. That is, the bundle adjustment is performed. As a supplement, it may be possible to use the Levenberg-Marquardt method or the like as a nonlinear optimization method.

In the bundle adjustment, the parameters $R_0, R_1, t_0, t_1$ having converged by the nonlinear optimization method are different from the those before the bundle adjustment, and therefore, it is preferable to perform the evaluation of outliers again. Further, it is also preferable to evaluate whether or not there is an image feature point that is not an outlier with the updated $R_0, R_1, t_0, t_1$ in the image feature points determined to be an outlier, and to perform processing to add the image feature point that is not an outlier. In addition, in this case, on a condition that an image feature point is deleted or added, it is better to perform the bundle adjustment again and update the parameters $R_0, R_1, t_0, t_1$.

At S507, the camera position and orientation parameter estimation unit 306 determines whether or not the estimation of the position and orientation parameter of the camera is completed at all the viewpoints (all the cameras) and in a case where the estimation is completed, the processing shown in FIG. 5 is terminated and in a case where the estimation is not completed, the camera position and orientation parameter estimation unit 306 advances the processing to S508.

At S508, the camera position and orientation parameter estimation unit 306 selects a viewpoint to be processed next (hereinafter, referred to as additional viewpoint) from the cameras (viewpoints) for which the estimation of the position and orientation parameter of the camera is not completed. It may also be possible to select two or more additional viewpoints at the same time. Further, it may also be possible to set the additional viewpoint in advance or to select a viewpoint whose number of points is sufficiently large, which correspond to the three-dimensional coordinates of the marker and the image feature point already found in the matching results of the marker and the image feature point. For example, in a case where the number of corresponding points of the camera viewpoint whose number of corresponding points is the largest is taken to be N, it may also be possible to select a camera viewpoint having the number of corresponding markers larger than or equal to a ratio determined in advance for N (for example, in a case of 60%, 0.5N) as an additional viewpoint. In addition, in a case where the order or the position relationships of the cameras is set roughly in advance, it may also be possible to select a viewpoint whose position is close and whose number of marker recognition results corresponding to the already-found three-dimensional coordinates of the markers is sufficiently large by using the information.

At S509, the camera position and orientation parameter estimation unit 306 estimates a projection matrix that causes the already-found three-dimensional coordinates corresponding to the image feature point and the two-dimensional coordinates of the marker and the image feature point of the additional viewpoint to correspond to each other. Specifically, it is sufficient to find $[R_k, t_k]$ so that the error between the point $[R_k, t_k]$ obtained by projecting the three-dimensional point $[X_i, Y_i, Z_i]$ found at the steps up to S507 and the two-dimensional coordinates $[x_{ki}, y_{ki}]$ corresponding to the there-dimensional point becomes a minimum.

Here, k is the index corresponding to the viewpoint to be added. Further, the re-projection error E ($R_k$, $t_k$) is represented by an expression below.

[Mathematical expression 9]

$$E(R_k, t_k) = \frac{1}{2}\sum_{i=1}^{N}\{(x_{ki} - x(R_k, t_k, p_i))^2 + (y_{ki} - y(R_k, t_k, p_i))^2\} \quad (9)$$

$$z_{ki}\begin{bmatrix} x(R_k, t_k, p_i) \\ y(R_k, t_k, p_i) \\ 1 \end{bmatrix} = A_k [\ R_k \quad t_k\ ]\begin{bmatrix} p_i \\ 1 \end{bmatrix}$$

In expression (9), different from expression (8), $p_i$ is handled as a fixed value, not as a parameter. It is possible to find this solution analytically,
and for a matrix M

[Mathematical expression 10]

$$M = \begin{bmatrix} X_1 & Y_1 & Z_1 & 1 & 0 & 0 & 0 & 0 & -x_{k1}X_1 & -x_{k1}Y_1 & -x_{k1}Z_1 & -x_{k1} \\ 0 & 0 & 0 & 0 & X_1 & Y_1 & Z_1 & 1 & -y_{k1}X_1 & -y_{k1}Y_1 & -y_{k1}Z_1 & -y_{k1} \\ X_2 & Y_2 & Z_2 & 1 & 0 & 0 & 0 & 0 & -x_{k2}X_2 & -x_{k2}Y_2 & -x_{k2}Z_2 & -x_{k2} \\ 0 & 0 & 0 & 0 & X_2 & Y_2 & Z_2 & 1 & -y_{k2}X_2 & -y_{k2}Y_2 & -y_{k2}Z_2 & -y_{k2} \\ \vdots & \vdots & \vdots & \vdots & \vdots & \vdots & \vdots & \vdots & \vdots & \vdots & \vdots & \vdots \\ X_N & Y_N & Z_N & 1 & 0 & 0 & 0 & 0 & -x_{kN}X_N & -x_{kN}Y_N & -x_{kN}Z_N & -x_{kN} \\ 0 & 0 & 0 & 0 & X_N & Y_N & Z_N & 1 & -y_{kN}X_N & -y_{kN}Y_N & -y_{kN}Z_N & -y_{kN} \end{bmatrix}, \quad (10)$$

$r_{11}$ to $r_{33}$ and $t_1$ to $t_3$ that satisfy

[Mathematical expression 11]

$$M^T M \begin{bmatrix} r_{11} \\ r_{12} \\ r_{13} \\ t_1 \\ r_{21} \\ r_{22} \\ r_{23} \\ t_2 \\ r_{31} \\ r_{32} \\ r_{33} \\ t_3 \end{bmatrix} = \begin{bmatrix} 0 \\ 0 \\ 0 \\ 0 \\ 0 \\ 0 \\ 0 \\ 0 \\ 0 \\ 0 \\ 0 \\ 0 \end{bmatrix} \quad (11)$$

are $R_k=[r_{ij}]$ and $t_k=[t_1]$ that minimize expression (9) and this is referred to as a projection matrix. It is possible to find $r_{11}$ to $r_{33}$ and $t_1$ to $t_3$ that satisfy expression (11) by performing singular value decomposition for $M^T M$ and finding an eigenvector corresponding to the minimum eigenvalue.

The processing such as this is referred to as a PnP method. As a supplement, a method referred to as EPnP is known as a method whose accuracy is high and whose processing speed is high, in which the PnP method is performed after transforming the three-dimensional world coordinates of a three-dimensional point into a coordinate system in accordance with a distribution of three-dimensional points.

Here, there is also a case where a large outlier is included due to the influence of the erroneous association of image feature points, and therefore, it is favorable to perform the robust estimation, such as ransac and the M estimation, also in the PnP method. In this case, as in the case with S501, it is better to perform the robust estimation in accordance with the level of reliability of the marker and the image feature point. Here, in a case where ransac is used as the robust estimation, by causing the marker and the image feature point whose reliability is high to be sampled at a high frequency, it is made easier to delete a marker and an image feature point inconsistent with the marker and the image feature point whose reliability is high as an outlier.

Further, in a case where the M estimation is used as the robust estimation, the marker and the image feature point are multiplied by the weights $\alpha_{1i}$, and $\alpha_{2i}$.

[Mathematical expression 12]

$$E(R_k, t_k) = \frac{1}{2}\sum_{i=1}^{N}\alpha_{ki}\{(x_{ki} - x(R_k, t_k, p_i))^2 + (y_{ki} - y(R_k, t_k, p_i))^2\} \quad (12)$$

$$z_{ki}\begin{bmatrix} x(R_k, t_k, p_i) \\ y(R_k, t_k, p_i) \\ 1 \end{bmatrix} = A_k [\ R_k \quad t_k\ ]\begin{bmatrix} p_i \\ 1 \end{bmatrix}$$

In the above expression, by performing a calculation by increasing $\alpha_{ki}$ of the marker and the image feature point whose reliability is high and decreasing $\alpha_{ki}$ of the marker and the image feature point whose reliability is low, it is made easier to delete an image feature point inconsistent with the marker and the image feature point whose reliability is high as an outlier.

At S510, the camera position and orientation parameter estimation unit 306 estimates the position and orientation parameter of the additional viewpoint from the projection matrix. Here, $R_k=[r_{ij}]$ estimated at S509 does not generally satisfy the condition of a rotation matrix because there are no constraints on the rotation matrix in a case where expression (11) is found. Consequently, it is sufficient to perform constrained nonlinear optimization so that $R_k{}^T R_k$ becomes a unit matrix, to find $R_k$ from the singular value decomposition of $P=[r_{ij}][t_i]$, and further to find $t_k$ by using $R_k$.

At S511, the camera position and orientation parameter estimation unit 306 estimates three-dimensional coordinates corresponding to the image feature point from the position and orientation parameter of the camera of the additional viewpoint estimated at S510 and the two-dimensional coordinates of the marker and the image feature point. Specifically, this processing is the same as the processing S505 whose number of cameras capable of seeing the point to be added is increased to M (>two).

In this case, the correspondence expression between the coordinates on the image of the marker and the three-dimensional coordinates is the same as expression (4) and the three-dimensional point is calculated by an expression below for the M cameras capable of seeing the point to be added.

[Mathematical expression 13]

$$p_i = \frac{\sum_k p_{ki}}{M} \quad (13)$$

It is possible to find $s_{k1i}$ to $s_{kMi}$ (here, k1, ..., kM are each an index corresponding to the camera capable of seeing the point) in expression (5) by increasing the number of viewpoints in expression (7) to M as in an expression below.

[Mathematical expression 14]

$$\begin{bmatrix} s_{k1i} \\ s_{k2i} \\ \vdots \\ s_{kMi} \end{bmatrix} = \begin{bmatrix} \left(1-\frac{1}{M}\right)a_{k1i}^T a_{k1i} & -\frac{1}{M}a_{k1i}^T a_{k2i} & \cdots & -\frac{1}{M}a_{k1i}^T a_{kMi} \\ -\frac{1}{M}a_{k2i}^T a_{k1i} & \left(1-\frac{1}{M}\right)a_{k2i}^T a_{k2i} & \ddots & \vdots \\ \vdots & \ddots & \ddots & -\frac{1}{M}a_{k(M-1)i}^T a_{kMi} \\ -\frac{1}{M}a_{kMi}^T a_{k1i} & \cdots & -\frac{1}{M}a_{kMi}^T a_{k(M-1)i} & \left(1-\frac{1}{M}\right)a_{kMi}^T a_{kMi} \end{bmatrix}^{-1} \begin{bmatrix} -a_{k1i}^T b_{k1i} + \frac{1}{M}a_{k1i}^T \sum_{k=k1}^{kM} b_{ki} \\ -a_{k2i}^T b_{k2i} + \frac{1}{M}a_{k2i}^T \sum_{k=k1}^{kM} b_{ki} \\ \vdots \\ -a_{kMi}^T b_{kMi} + \frac{1}{M}a_{kMi}^T \sum_{k=k1}^{kM} b_{ki} \end{bmatrix} \quad (14)$$

Then, by substituting $s_{k1i}$ to $s_{kMi}$ calculated by expression (14) in expression (5), it is possible to find the three-dimensional point $p_i$ from expression (13). In a case where there is a negative value in $s_{k1i}$ to $s_{kMi}$ calculated by expression (14), a three-dimensional point is generated at the side behind the camera (that is, predicted as an erroneous corresponding point), and therefore, in such a case, it is sufficient to delete the negative value as an outlier. Alternatively, in a case where the number of cameras capable of seeing the point is two or more even though the camera is excluded, it is sufficient to derive the three-dimensional coordinates by the remaining corresponding points by handling the corresponding points of the camera as outliers.

At S512, the camera position and orientation parameter estimation unit 306 performs fine adjustment for the position and orientation parameter and the three-dimensional coordinates corresponding to the image feature point so that the re-projection error of the three-dimensional coordinates corresponding to the image feature point onto the camera image becomes a minimum. The position and orientation parameter is estimated at S504 and S510 and the three-dimensional coordinates corresponding to the image feature point are estimated at S505 and S511. The processing at S512 is the same as the processing at S506, and therefore, explanation thereof is omitted here.

In a case where S512 is completed, the processing returns to S507 and whether or not the processing is completed in all the cameras is determined (whether or not the estimation of the position and orientation parameter of the camera is completed in all the cameras is determined) (S507) and in a case where the processing is completed, the processing shown in FIG. 5 is terminated. In a case where the processing is not completed, the processing advances to S508.

As above, of the captured image, images regarded as being those captured at the same position and with the same orientation are extracted as a still image group in each camera. Then, the still image groups of the same time whose number if larger than or equal to the minimum number of cameras setting value (larger than or equal to the predetermined number of cameras) are selected as a combination and further, the position and orientation parameter of the camera is estimated by using the selected still image groups. Due to this, it is possible to estimate the position and orientation parameter of the camera with a high accuracy.

Second Embodiment

In the first embodiment, the example is explained in which images regarded as being those captured at the same position and with the same orientation by each camera are extracted as the still image group and the still image groups of the same time whose number is larger than or equal to the minimum number of cameras setting value are selected as a combination and the position and orientation parameter is estimated.

However, at the time of selecting a combination of the still image groups, in a case where a marker for calibration is used, it is preferable to consider whether or not the markers are distributed across the entire area on the screen. Consequently, in a second embodiment, an example is explained in which, of the images captured by a plurality of cameras at the same time, in the images (still image group) in the time zone in which the vibration is smaller than or equal to the allowable vibration setting value, by using the still image group that increases a marker distribution evaluation value, the position and orientation parameter is estimated.

Figure 9:
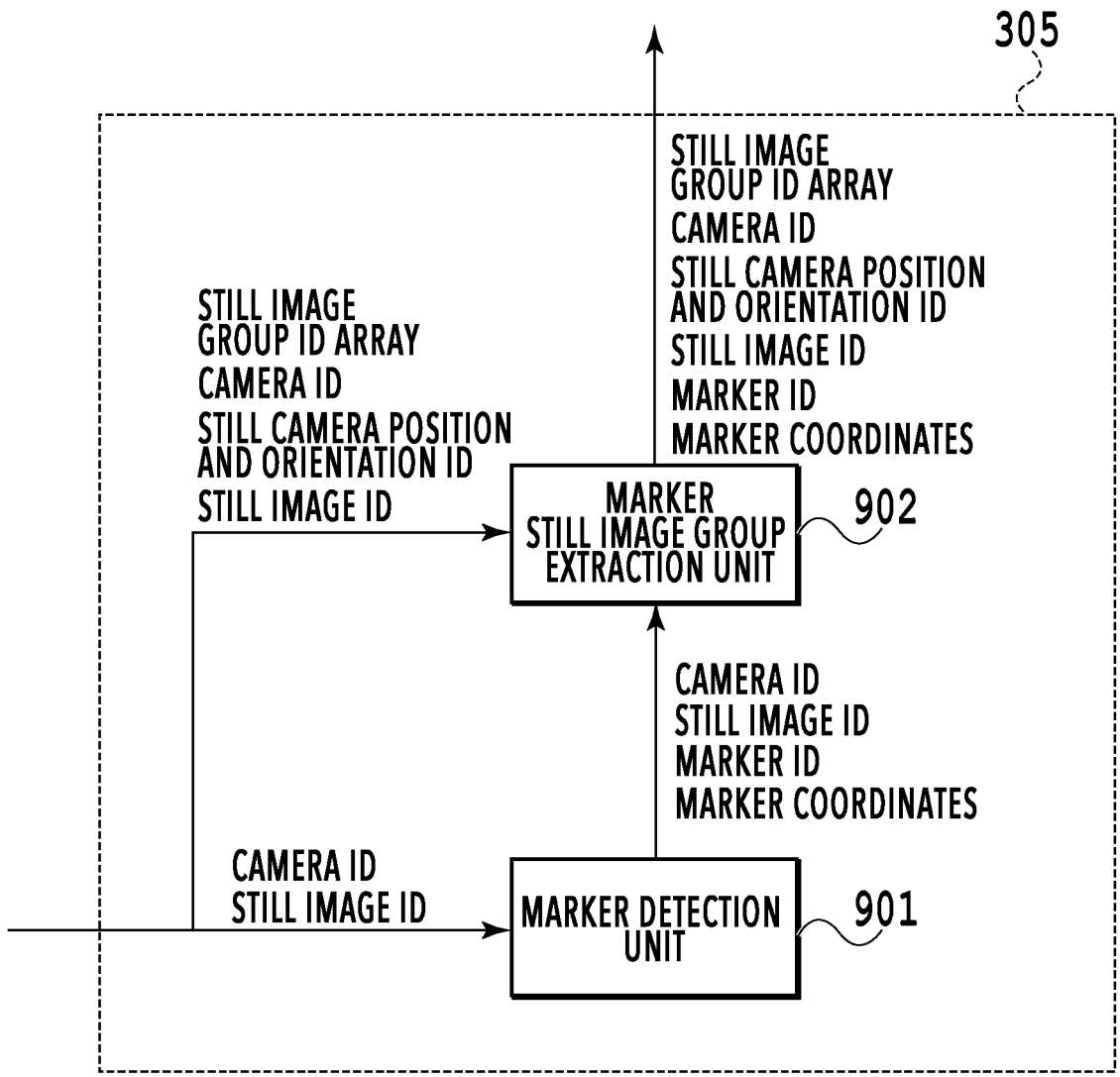
FIG. 9 is a function block diagram of a still image group selection unit.
Figure 10:
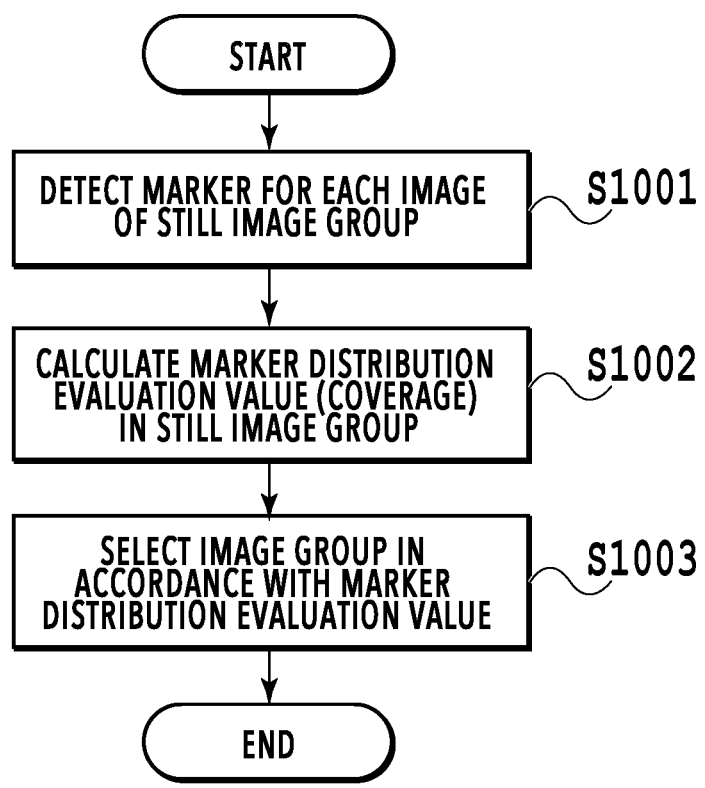
FIG. 10 is a flowchart showing a procedure of processing to select a still image group.

In the following, the estimation of the position and orientation parameter in the present embodiment is explained with reference to the function block diagram (FIG. 9) of the still image group selection unit 305 and the flowchart (FIG. 10) indicating the procedure of processing to select a still image group by taking into consideration the marker distribution at S407 described above.

At S1001, a marker detection unit 901 detects two-dimensional coordinates of a calibration marker and a marker ID identifying the kind of the marker for a still image corresponding to the still image ID of each camera stored in the RAM 202 and stores them in the RAM 202.

The calibration marker may be, for example, a circle, a double circle, a cross mark, or a checkerboard pattern drawn on a plane, a sphere, or an AR marker. Further, the coordinates to be detected may be any coordinates as long as it is possible to recognize the feature point corresponding to a point on a space as a point on the image of each camera, such as the center in a case of a circle or a double circle, the sphere center in a case of a sphere, the center of the intersecting area in a case of a cross mark, and the intersection point of white and black rectangles in a case of a checkerboard pattern.

Figure 11:
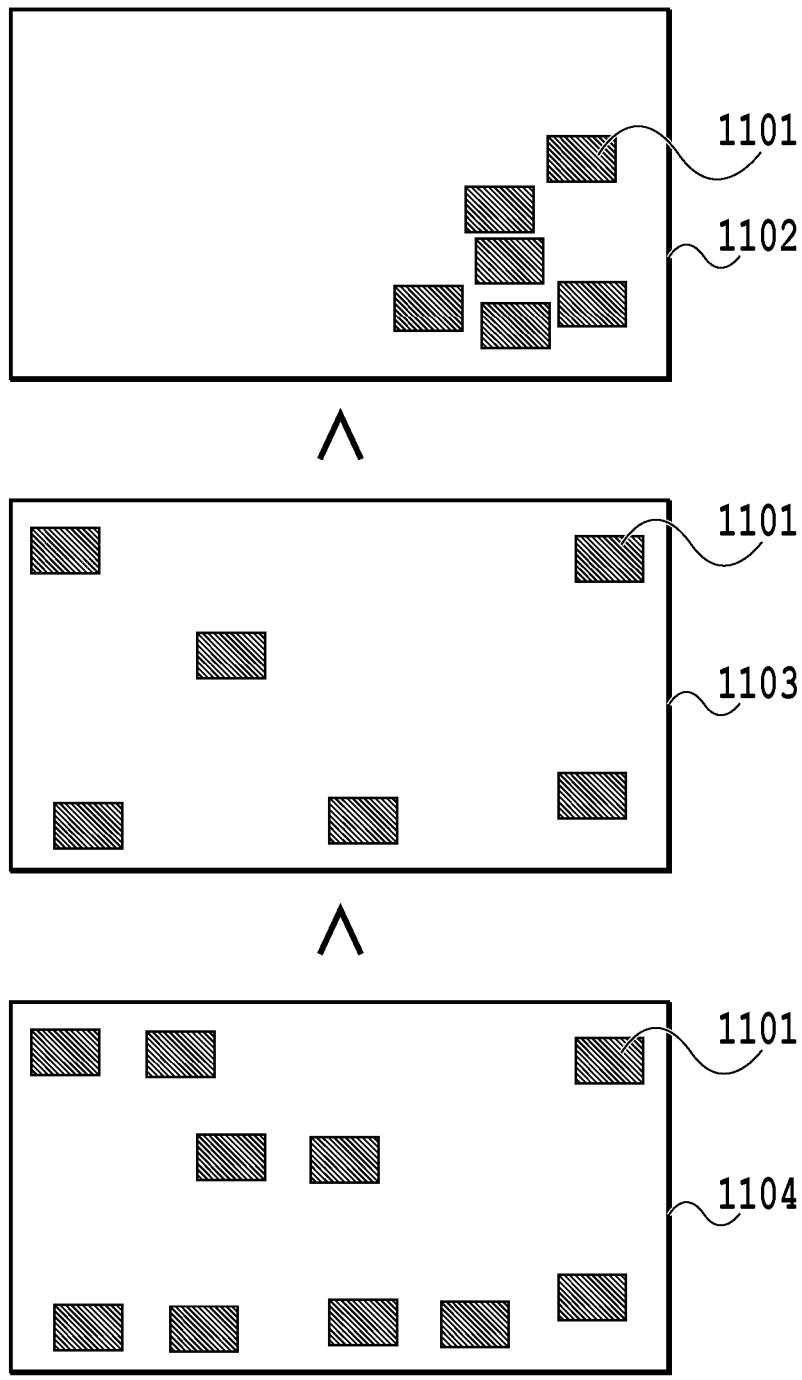
FIG. 11 is a diagram for explaining a marker distribution evaluation value.

At S1002, a marker still image group extraction unit 902, which is an example of a distribution evaluation value derivation unit (coverage derivation unit), calculates a marker distribution evaluation value of each corresponding camera for each still image group ID stored in the RAM 202. Here, the calculation of a marker distribution evaluation value is explained by using FIG. 11. In FIG. 11, symbols 1102 to 1104 each indicate an image and a plurality of rectangles 1101 within the image indicates a marker. Here, in a case where the number of markers 1101 is the same, the calculation accuracy becomes high for the image in which the markers are dispersed in a wide range. Because of this, for the image 1102 and the image 1103 whose number of markers 1101 is the same, it is preferable to set the distribution evaluation value of the image 1103 higher than that of the image 1102. On the other hand, in a case where the markers 1101 are dispersed in the same range, the calculation accuracy becomes higher for the image whose number of markers 1101 is larger. Because of this, for the image 1103 and the image 1104 in which the markers 1101 are dispersed in the same range, it is preferable to set the distribution evaluation value of the image 1104 higher than that of the image 1103.

Then, as the distribution evaluation value that satisfies the relationship such as this, for example, it is possible to discuss the following indexes (index 1 to index 3) and by using one or more of the indexes 1 to 3, it is possible to calculate the distribution evaluation value.

As the index 1, it is possible to discuss "(maximum value of x−minimum value of x)×(maximum value of y−minimum value of y)". Further, as the index 2, it is possible to discuss "sum of areas covered by circles in a case where the circles whose center is the marker coordinates and whose radius is R are drawn". Furthermore, as the index 3, it is possible to discuss "the number of small areas within which the marker exists in a case where the entire image is partitioned into small areas (for example, 10×10 small areas or the like)".

At S1003, the marker still image group extraction unit 902 extracts one still image group ID whose still camera position and orientation ID in the same camera ID is the same from the data stored in the RAM 202. At S1003, for example, it is sufficient to extract a still image group so that the sum of the marker distribution evaluation value of each camera becomes high. Alternatively, it may also be possible to present several still image group IDs whose marker distribution evaluation value is high to a user and to enable the user to select a still image group from the presented still image groups.

As above, in the present embodiment, images regarded as being those captured at the same position and with the same orientation by each camera are extracted as a still image group and the still image groups of the same time whose number is larger than or equal to the minimum number of cameras setting value are selected by taking into consideration the marker distribution evaluation value. Due to this, it is possible to estimate the position and orientation parameter with a high accuracy.

Third Embodiment

In the first and second embodiments, images regarded as being those captured at the same position and with the same orientation by each camera are extracted as a still image group and one combination of the still image groups is selected so that the camera position and orientation ID of the image of each camera becomes the same and the position and orientation parameter is estimated. However, in the first and second embodiments, the marker and the image feature quantity of the still image group of the still camera position and orientation ID different from the selected still camera position and orientation ID in the same camera are not used for the estimation of the position and orientation parameter. Consequently, in a third embodiment, the position and orientation parameter is estimated by using the image group whose position and orientation are different of the same camera.

Figure 12:
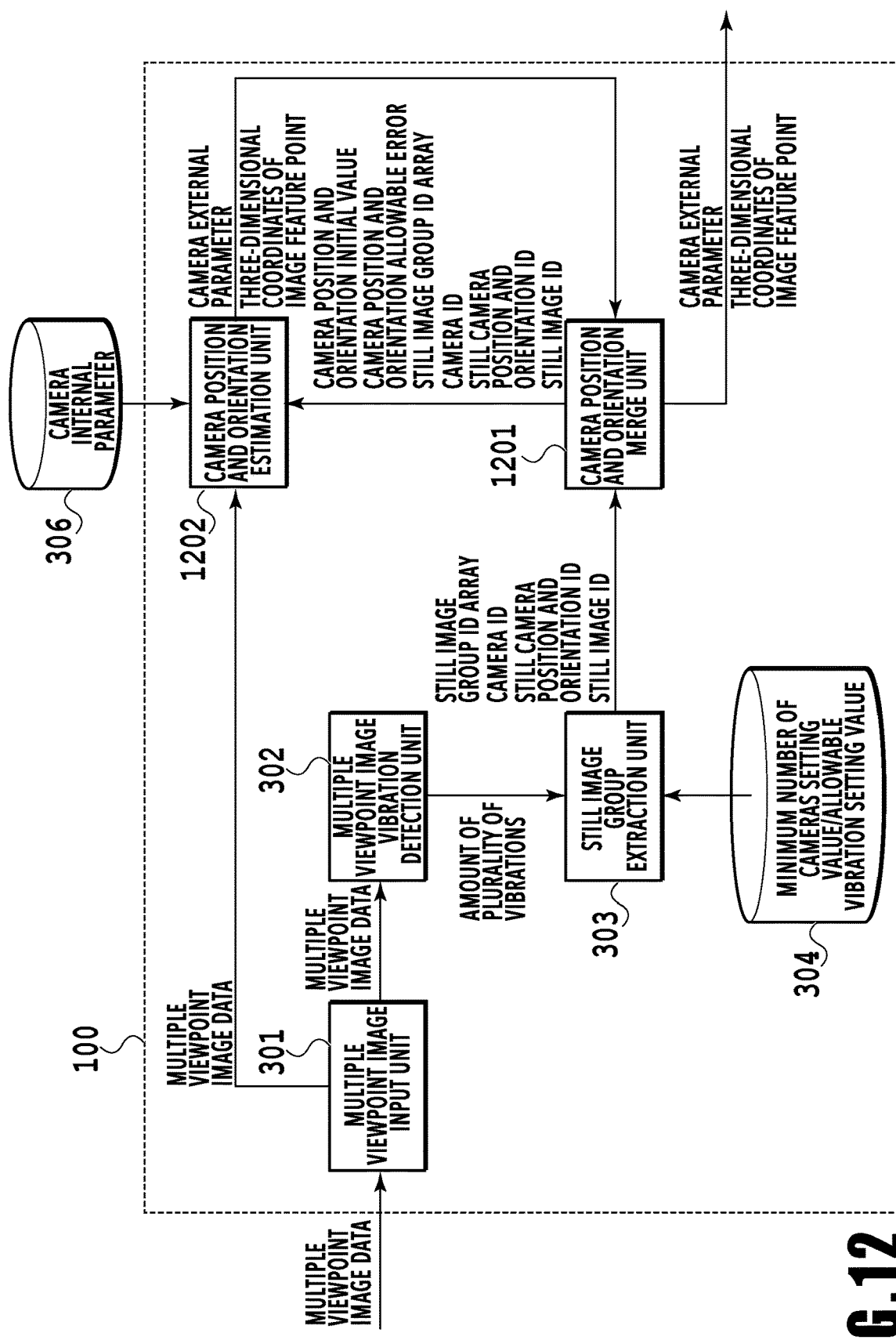
FIG. 12 is a function block diagram of the image processing apparatus.
Figure 13:
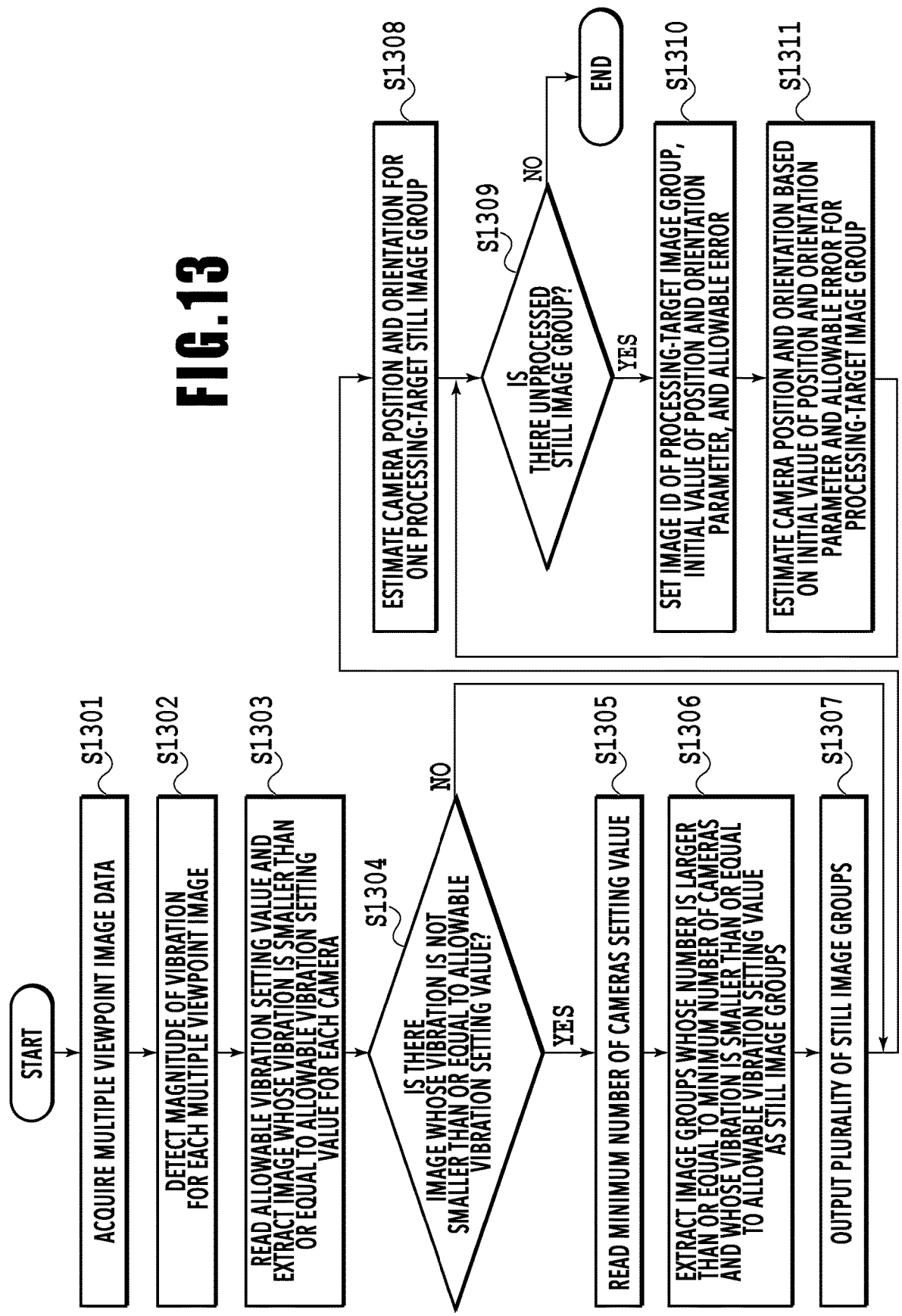
FIG. 13 is a flowchart showing a procedure of processing in the image processing apparatus.

In the following, the processing and the procedure of the processing in the image processing apparatus 102 according to the present embodiment are explained by using the function block diagram shown in FIG. 12 and the flowchart shown in FIG. 13. Here, explanation of the same processing as that of the first embodiment is omitted (that is, for example, the processing at S1301 to S1306 is the same as the processing at S401 to S406, and therefore, explanation thereof is omitted) and attention is focused on differences from the first embodiment and the differences are explained.

At S1307, the still image group selection unit 305 extracts a plurality of still image group IDs whose still camera position and orientation ID in the same camera ID is the same from the camera ID, the still camera position and orientation ID, the still image ID, and the still image group ID stored in the RAM 202.

As the criterion of extraction of the still image group ID, for example, it is sufficient to extract the still image group ID in descending order of the number of images included in the still image group ID. For example, in a case of FIG. 7, that is, in a case where the minimum number of cameras setting value is three and the number of cameras is three, regarding the still image group ID, the number of images is larger in order of A, B, C, and D (that is, A>B>C>D) and the order of processing is A→B→C→D. In a case of FIG. 8, that is, in a case where the minimum number of cameras setting value is two and the number of cameras is three, regarding the still image group ID array, the number of images is larger in order of [G, J], [E, G], [F, H], and [G, I] (that is, [G, J]>[E, G]>[F, H]>[G, I]) and the order of processing is [G J]→[E, G]→[F, H]→[G, I]. In addition, it may also be possible to present several still image group IDs to a user and to cause the user to select the processing target and the processing order therefrom.

Regarding S1308, in accordance with the processing order, the position and orientation parameter is estimated for the processing-target still image group ID. The estimation of the position and orientation parameter is the same as that at S408 in FIG. 4. That is, the processing of a camera position and orientation estimation unit 1202 here is the same as the processing of the camera position and orientation estimation unit 306 and the position and orientation parameter and the three-dimensional coordinates of an image feature point are estimated and stored in the RAM 202.

At S1309, a camera position and orientation merge unit 1201 determines whether there is an unprocessed still image group of the images corresponding to the still image group ID stored in the RAM 202. Then, in a case where there is no unprocessed still image group (No at S1309), the processing shown in FIG. 13 is terminated and in a case where there is an unprocessed still image group (Yes at S1309), the processing advances to step S1310.

At S1310, the camera position and orientation merge unit 1201 sets the image ID of the image group to be processed next by the camera position and orientation estimation unit 1202, the initial value of the position and orientation parameter, and the allowable error and stores them in the RAM 202.

Here, it is assumed that the initial value of the position and orientation parameter is the position and orientation parameter estimated at S1308. Further, it is sufficient to set the allowable error small (or to zero) in a case where the still camera position and orientation ID corresponding to the processing-target still image group ID of the camera is set as the initial value and in the other cases, it is sufficient to set the allowable error large. For example, in a case of performing image capturing by a telescope lens, the distance between the object and the camera is generally large, and therefore, a change in position due to the vibration of the camera is small compared to the distance between the object and the camera and because of this, the allowable error of the camera position may be set small (or set to zero). It is sufficient to set the allowable error of the position and orientation parameter in accordance with the magnitude of the vibration.

At S1311, the camera position and orientation estimation unit 1202 estimates the position and orientation parameter and the three-dimensional coordinates of the image feature point by using the camera ID and the image feature point of the image corresponding to the image ID stored in the RAM 202 and stores them in the RAM 202. Here, the initial value of the position and orientation parameter and the allowable error set at S1310 are also used. After S1311 is performed, the processing returns to S1309 and whether or not to terminate the processing is determined.

Figure 14:
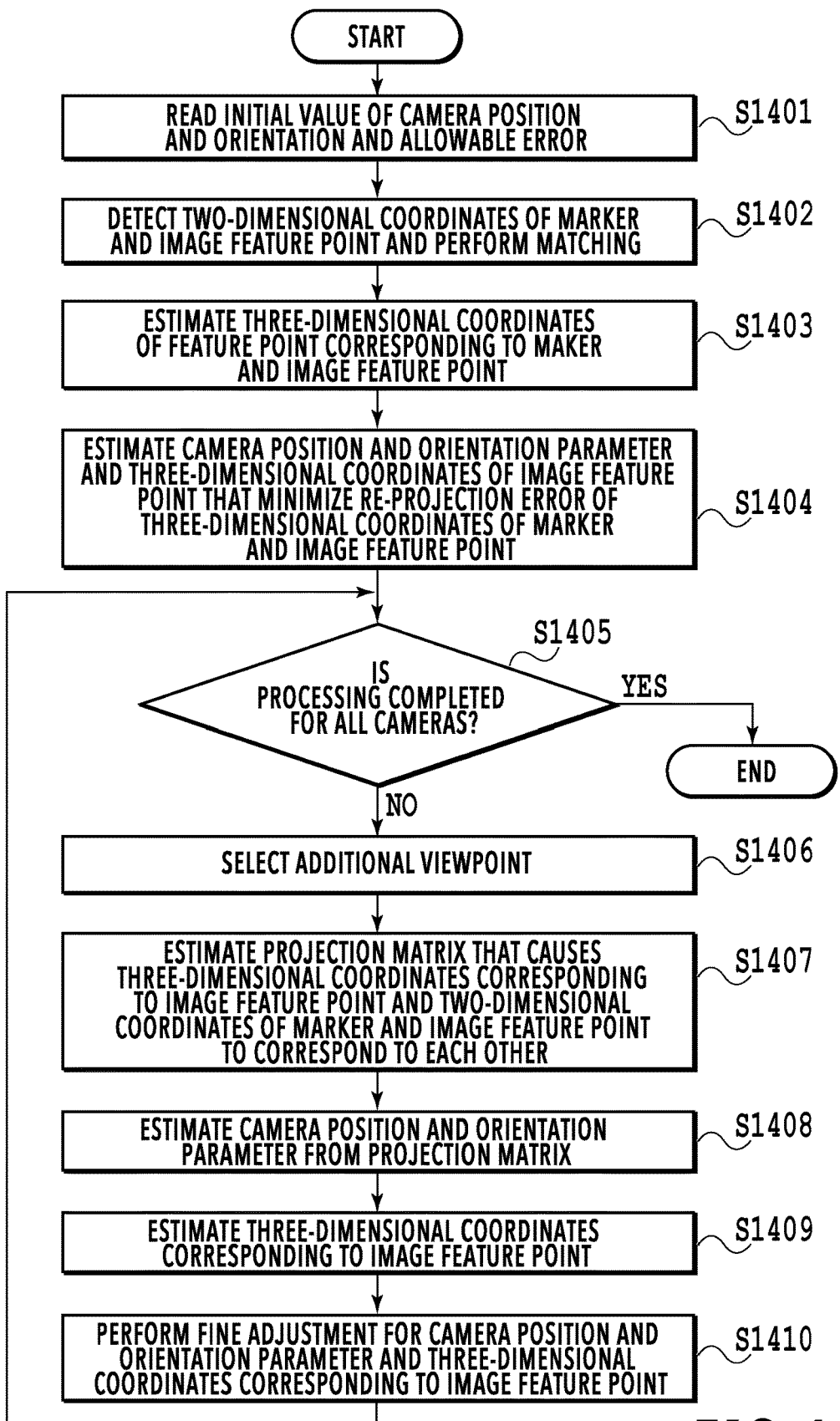
FIG. 14 is a flowchart showing a procedure of estimation processing of a position and orientation parameter of a camera.

Next, supplementary explanation is given to details of the processing of the camera position and orientation estimation unit 1202 at S1311 by using the flowchart in FIG. 14. At S1401, the camera position and orientation estimation unit 1202 reads the initial value of the position and orientation parameter and the allowable error stored in the RAM 202.

At S1402, the camera position and orientation estimation unit 1202 detects two-dimensional coordinates of a marker and an image feature point for a plurality of images of all the cameras, and performs matching of the marker and the image feature point between the cameras and stores the estimation results in the SRAM 202. In this case, in order to increase the speed of the processing, it is preferable to limit the number of pairs of cameras for which matching of the feature point and the marker is performed based on the initial value of the position and orientation parameter.

At S1403, the camera position and orientation estimation unit 1202 estimates three-dimensional coordinates corresponding to the image feature point from the initial value of the position and orientation parameter set at S1401, the two-dimensional coordinates of the marker and the image feature point, and the matching results. The estimation method is the same as that at S505, and therefore, explanation thereof is omitted here.

At S1404, the camera position and orientation estimation unit 1202 performs fine adjustment for the position and orientation parameter and the three-dimensional coordinates corresponding to the image feature point so that the re-projection error of the three-dimensional coordinates corresponding to the image feature point is small and the error from the initial value of the position and orientation parameter is included within the allowable error. Specifically, it is sufficient to add errors (for example, Euclid norms) from the initial values of $R_k$ and $t_k$ to expression (8) and to perform the nonlinear optimization calculation by a method, such as Lagrange's method of undetermined multipliers.

The processing at S1405 to S410 is the same as the processing at S507 to S512, and therefore, explanation thereof is omitted here. The processing at S1406 and subsequent steps is performed in a case where there is a camera for which it is not possible to estimate the position and orientation parameter at S1308 and it is not possible to set the initial value. In this case, there is no initial value, and therefore, it may be possible to perform a calculation without setting the constraint conditions of the nonlinear optimization calculation for the camera.

As above, the position and orientation parameter is estimated by extracting images regarded as being those captured at the same position and with the same orientation by each camera as a still image group and sequentially selecting the still image groups of the same time whose number is larger than or equal to the minimum number of cameras setting value as a combination. Due to this, it is possible to estimate the position and orientation parameter with a high accuracy.

Fourth Embodiment

In the third embodiment described above, the position and orientation parameter is estimated by sequentially selecting image groups at different positions and with different orientations of the same camera as those of a different camera whose position is close and whose orientation is similar. However, in a case where the position and orientation parameter is estimated, on a condition that the calculation (processing) is performed in order as in the third embodiment, there is a possibility that it takes time accordingly until the position and orientation parameter is estimated.

Consequently, in a fourth embodiment, the positions of a marker and an image feature point are transformed by regarding a deviation in the image feature point due to the variation in the position and orientation of the camera as being a planar variation that can be transformed by homography transformation. Due to this, on the assumption that the position and orientation of the camera do not change in each camera, the position and orientation parameter is estimated by one-time calculation.

Figure 15:
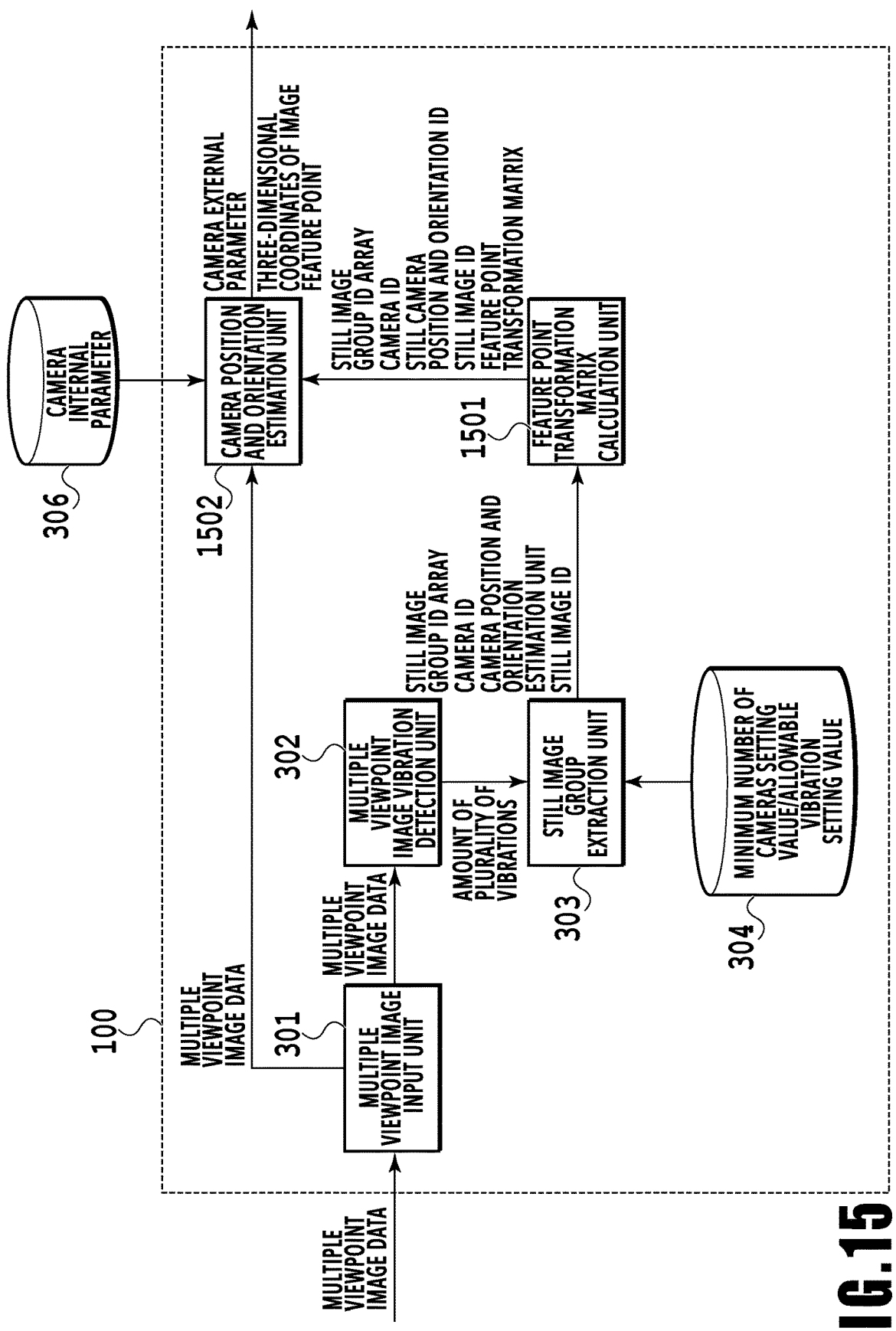
FIG. 15 is a function clock diagram of the image processing apparatus.
Figure 16:
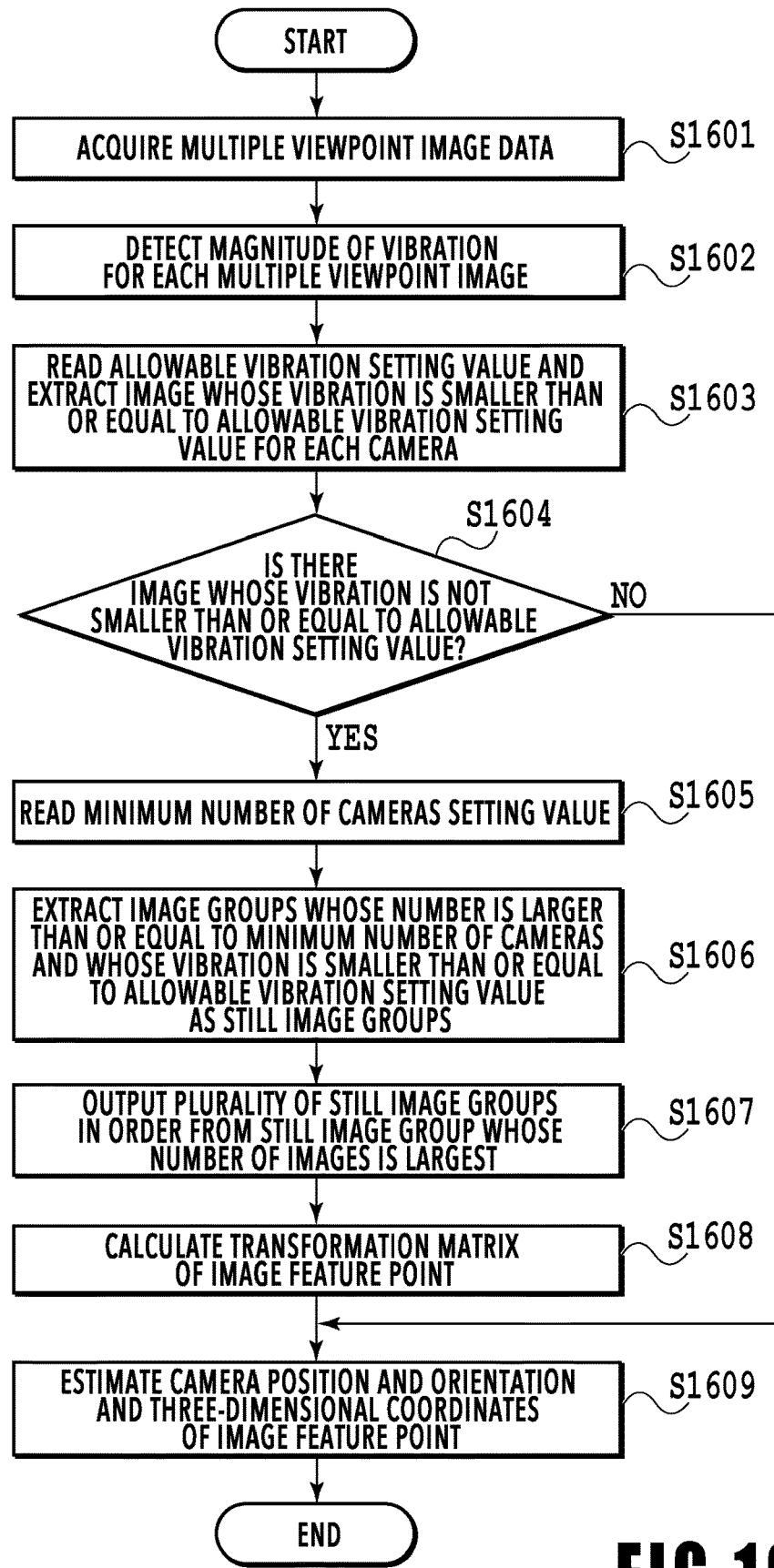
FIG. 16 is a flowchart showing a procedure of processing in the image processing apparatus.

In the following, the processing and the procedure of the processing in the image processing apparatus 102 according to the present embodiment are explained by using the function block diagram shown in FIG. 15 and the flowchart shown in FIG. 16. Here, explanation of the same processing as that of the first embodiment is omitted (that is, for example, the processing at S1601 to S1607 is the same as the processing at S1301 to S1307, and therefore, explanation thereof is omitted).

At S1608, a feature point transformation matrix calculation unit 1501 calculates a transformation matrix of the image feature point corresponding to the still image ID of the processing-target still image group. The transformation matrix here is specifically a homography transformation matrix. Further, it is assumed that the reference image is the image belonging to the first still image group ID.

Here, as the image feature point, an image feature point whose spatial position does not change at different points in time. Specifically, for example, the image feature point is detected in the top image of the first still image group and in a case where the image feature point is tracked at different points in time and on a condition that it is possible to stably track the image feature point at different points in time, the image feature point may be adopted (selected).

Further, by using the correspondence of the results of the tracking or the feature point matching with a still image belonging to a different still image group ID for the selected image feature point, a homography transformation matrix is calculated. Then, by using the calculated homography transformation matrix, the two-dimensional coordinates of the feature point in the image belonging to the different still image group ID are transformed into two-dimensional coordinates corresponding to the image belonging to the first still image group ID.

The reference image of the homography transformation is not necessarily limited to the image belonging to the first still image group ID. Further, in a case where there is a camera ID not included in the first still image group ID, it is sufficient to select an image belonging to a still image group ID whose priority of processing is as high as possible.

At S1609, a camera position and orientation estimation unit 1502 estimates the position and orientation parameter and the three-dimensional coordinates of the image feature point by using the camera ID stored in the RAM 202 and the results of transforming the image feature point of the image corresponding to the still image ID by a feature point transformation matrix.

The processing of the camera position and orientation estimation unit 1502 at S1609 is the same as the flow in FIG. 5 except in that the two-dimensional coordinates of the marker and the image feature quantity are transformed by the feature point transformation matrix at S501, and therefore, explanation thereof is omitted here.

As above, by regarding the deviation in the image feature point due to the variation in the position and orientation of the camera as being a planar variation that can be transformed by the homography transformation, the positions of a marker and an image feature point are transformed. Due to this, on the supposition that the position and orientation of a camera do not change in each camera, the position and orientation parameter is estimated by one-time calculation. That is, it is possible to estimate the position and orientation parameter with a high accuracy without repeating the calculation (processing).

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, even in a case where the position and orientation of a camera vary during camera calibration, it is possible to estimate the position and orientation parameter of a multiple viewpoint camera with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-083457 filed Apr. 24, 2018, which is hereby incorporated by reference wherein in its entirety.

What is claimed is:

1. A calibration apparatus comprising:
   an image acquisition unit configured to acquire images captured by a plurality of image capturing apparatuses;
   a vibration detection unit configured to detect vibration of the image capturing apparatus from the images for each of the image capturing apparatuses;
   an extraction unit configured to extract images captured by the image capturing apparatus whose vibration is within an allowable value and whose position and orientation are regarded as being the same as an image group for each of the image capturing apparatuses;
   a selection unit configured to select the image groups whose number is larger than or equal to a predetermined number of image capturing apparatuses as a combination; and
   an estimation unit configured to estimate a position and orientation parameter for each of the image capturing apparatuses by using the selected combination of the image groups.

2. The calibration apparatus according to claim 1, wherein the selection unit has:
   a marker detection unit configured to detect a marker from the image; and a derivation unit configured to derive a coverage of the marker for each of the combinations of the image groups and the selection unit selects the combination of the image groups in accordance with the coverage of the marker.

3. The calibration apparatus according to claim 2, wherein the derivation unit derives the coverage of the marker by one of indexes (a) to (c) below (a) (maximum value of x−minimum value of x)×(maximum value of y−minimum value of y) in a case where coordinates of the marker are taken to be (x, y), (b) sum of areas covered by circles in a case where the circles whose center is the marker coordinates and whose radius is R are drawn, and (c) a number of predetermined areas within which the marker exists in a case where an entire image is partitioned into the predetermined areas.

4. The calibration apparatus according to claim 1, wherein the selection unit selects a plurality of the combinations of the image groups and the estimation unit estimates a position and orientation parameter for each of the image capturing apparatuses by estimating a position and orientation parameter for each of the image capturing apparatuses corresponding to a first image group of a plurality of image groups selected as a combination by the selection unit and by estimating a position and orientation parameter for each of the image capturing apparatuses corresponding to a second image group by using the estimated position and orientation parameter for each of the image capturing apparatuses corresponding to the first image group.

5. The calibration apparatus according to claim 4, wherein the estimated position and orientation parameter is adjusted so as to be included within an allowable error.

6. The calibration apparatus according to claim 1, further comprising:

a derivation unit configured to derive a transformation matrix from correspondence between image feature points extracted from images of one image group of a plurality of image groups selected as a combination by the selection unit and the image feature points in images of an image group different from the one image group, wherein the estimation unit estimates a position and orientation parameter of the image capturing apparatus for each of the image capturing apparatuses by further using results of transformation by the transformation matrix.

7. The calibration apparatus according to claim 1, wherein the selection unit selects an image group whose number of images is large as an image group to be selected as the combination.

8. The calibration apparatus according to claim 1, wherein the selection unit comprises a display unit configured to present the image groups to a user and to receive a selection from the user.

9. A non-transitory computer readable storage medium storing a program for causing a computer to function as a calibration apparatus comprising:

an image acquisition unit configured to acquire images captured by a plurality of image capturing apparatuses;

a vibration detection unit configured to detect vibration of the image capturing apparatus from the images for each of the image capturing apparatuses;

an extraction unit configured to extract images captured by the image capturing apparatus whose vibration is within an allowable value and whose position and orientation are regarded as being the same as an image group for each of the image capturing apparatuses;

a selection unit configured to select the image groups whose number is larger than or equal to a predetermined number of image capturing apparatuses as a combination; and an estimation unit configured to estimate a position and orientation parameter for each of the image capturing apparatuses by using the selected combination of the image groups.

10. A calibration method comprising:

an image acquisition step of acquiring, by an image acquisition unit, images captured by a plurality of image capturing apparatuses;

a vibration detection step of detecting, by a vibration detection unit, vibration of the image capturing apparatus from the images for each of the image capturing apparatuses;

an extraction step of extracting, by an extraction unit, images captured by the image capturing apparatus whose vibration is within an allowable value and whose position and orientation are regarded as being the same as an image group for each of the image capturing apparatuses;

a selection step of selecting, by a selection unit, the image groups whose number is larger than or equal to a predetermined number of image capturing apparatuses as a combination; and an estimation step of estimating, by an estimation unit, a position and orientation parameter for each of the image capturing apparatuses by using the selected combination of the image groups.

* * * * *